US010443511B2

(12) United States Patent
Ethier et al.

(10) Patent No.: US 10,443,511 B2
(45) Date of Patent: Oct. 15, 2019

(54) CONTROL OF FUEL FLOW FOR POWER GENERATION BASED ON DC LINK LEVEL

(71) Applicant: Dynamo Micropower Corporation, Somerville, MA (US)

(72) Inventors: Jason How-Ring Ethier, Somerville, MA (US); Ivan Wang, Boston, MA (US); German Lakov, Brookline, MA (US)

(73) Assignee: Dynamo Micropower Corporation, Somerville, MA (US)

( * ) Notice: Subject to any disclaimer, the term of this patent is extended or adjusted under 35 U.S.C. 154(b) by 0 days.

(21) Appl. No.: 15/901,659

(22) Filed: Feb. 21, 2018

(65) Prior Publication Data
US 2019/0055890 A1 Feb. 21, 2019

Related U.S. Application Data

(60) Provisional application No. 62/461,595, filed on Feb. 21, 2017.

(51) Int. Cl.
*F02C 9/42* (2006.01)
*F02B 37/00* (2006.01)
*F02B 41/10* (2006.01)
*F02D 29/06* (2006.01)
*F02C 6/14* (2006.01)
(Continued)

(52) U.S. Cl.
CPC .............. *F02C 9/42* (2013.01); *F02B 37/004* (2013.01); *F02B 41/10* (2013.01); *F02C 3/10* (2013.01); *F02C 6/14* (2013.01); *F02C 9/56* (2013.01); *F02D 29/06* (2013.01); *H02J 3/32* (2013.01); *H02J 7/1415* (2013.01); *H02K 7/1815* (2013.01); *H02K 7/1823* (2013.01); *H02K 11/0094* (2013.01); *H02K 11/046* (2013.01); *F05D 2220/764* (2013.01); *F05D 2260/15* (2013.01); *F05D 2260/42* (2013.01); *F05D 2260/43* (2013.01); *Y02T 10/144* (2013.01); *Y02T 10/163* (2013.01)

(58) Field of Classification Search
USPC .......... 290/1 A, 2, 40 R, 52; 307/64; 701/19
See application file for complete search history.

(56) References Cited

U.S. PATENT DOCUMENTS 4,809,500 A 3/1989 Roberts, Jr.
5,949,153 A 9/1999 Tison et al.
(Continued)

FOREIGN PATENT DOCUMENTS

EP 2762677 A2 1/2014

OTHER PUBLICATIONS

International Search Report and Written Opinion for Application No. PCT/US2018/019041 dated Apr. 26, 2018.

*Primary Examiner* — Pedro J Cuevas
(74) *Attorney, Agent, or Firm* — Wolf, Greenfield & Sacks, P.C.

(57) ABSTRACT

A power generating unit, control unit and modular power generating system. A power generating unit includes an engine-generator set including an engine that produces mechanical power and a generator mechanically coupled to the engine. The generator converts the mechanical power to electrical power provided to a DC link. The control unit includes at least one controller configured to control fuel flow to the engine based on a voltage of the DC link.

21 Claims, 24 Drawing Sheets

(51) Int. Cl.
  *F02C 9/56* (2006.01)
  *F02C 3/10* (2006.01)
  *H02J 7/14* (2006.01)
  *H02K 7/18* (2006.01)
  *H02K 11/00* (2016.01)
  *H02K 11/04* (2016.01)
  *H02J 3/32* (2006.01)

(56) References Cited

U.S. PATENT DOCUMENTS

| | | |
|---|---|---|
| 5,998,960 A | 12/1999 | Yamada et al. |
| 6,093,975 A | 7/2000 | Peticolas |
| 6,134,124 A | 10/2000 | Jungreis et al. |
| 6,219,623 B1 | 4/2001 | Wills |
| 6,265,786 B1 * | 7/2001 | Bosley ............... E21B 47/0008 290/46 |
| 6,281,601 B1 | 8/2001 | Edelman et al. |
| 6,325,142 B1 * | 12/2001 | Bosley ............... E21B 47/0008 166/53 |
| 6,487,096 B1 | 11/2002 | Gilbreth et al. |
| 6,495,929 B2 * | 12/2002 | Bosley ..................... F02C 9/56 290/52 |
| 6,522,030 B1 | 2/2003 | Wall et al. |
| 6,639,328 B2 | 10/2003 | Wacknov |
| 6,703,719 B1 * | 3/2004 | McConnell ............ F01D 15/10 290/52 |
| 6,725,134 B2 * | 4/2004 | Dillen .................... F02D 29/02 123/339.18 |
| 6,787,933 B2 | 9/2004 | Claude et al. |
| 6,870,279 B2 | 3/2005 | Gilbreth et al. |
| 6,879,053 B1 * | 4/2005 | Welches ................... H02J 3/30 290/1 A |
| 6,958,550 B2 | 10/2005 | Gilbreth et al. |
| 6,969,922 B2 * | 11/2005 | Welches ................... H02J 3/30 290/1 A |
| 7,002,317 B2 | 2/2006 | Ganev |
| 7,075,306 B2 | 7/2006 | Emori et al. |
| 7,148,649 B2 | 12/2006 | Ganev |
| 7,245,035 B2 * | 7/2007 | Anzioso ................... F02G 5/02 290/1 A |
| 7,305,939 B2 | 12/2007 | Carlson |
| 7,315,778 B1 * | 1/2008 | Kumar ............... F02D 41/1497 123/357 |
| 7,321,211 B2 | 1/2008 | Peterson |
| 7,474,016 B2 | 1/2009 | Wang et al. |
| 7,615,881 B2 | 11/2009 | Halsey et al. |
| 7,629,701 B2 * | 12/2009 | Campanile ............... F02C 6/18 290/1 A |
| 7,656,060 B2 | 2/2010 | Algrain |
| 7,667,347 B2 | 2/2010 | Donnelly et al. |
| 7,759,810 B2 * | 7/2010 | Kumar .................... F02D 41/22 290/40 R |
| 7,777,358 B2 | 8/2010 | Halsey et al. |
| 7,786,616 B2 | 8/2010 | Naden et al. |
| 7,884,491 B2 | 2/2011 | Halsey et al. |
| 7,944,081 B2 | 5/2011 | Donnelly et al. |
| 8,022,572 B2 | 9/2011 | Vyas et al. |
| 8,198,753 B2 | 6/2012 | Algrain |
| 8,227,929 B2 | 7/2012 | Burra et al. |
| 8,373,949 B2 | 2/2013 | Bourgeau |
| 8,446,037 B2 | 5/2013 | Williams |
| 8,538,611 B2 * | 9/2013 | Kumar ................ B61L 27/0027 700/291 |
| 8,584,459 B2 * | 11/2013 | Richards ................. F01D 15/10 290/52 |
| 8,692,521 B2 | 4/2014 | Moore et al. |
| 8,838,312 B2 | 9/2014 | Sadler |
| 8,866,344 B2 | 10/2014 | Hedquist |
| 8,924,049 B2 * | 12/2014 | Kumar ................ B61L 27/0027 701/19 |
| 8,963,374 B2 | 2/2015 | Wang |
| 8,975,767 B2 | 3/2015 | Algrain |
| 8,987,939 B2 | 3/2015 | Yu et al. |
| 8,994,214 B2 | 3/2015 | Apalenek et al. |
| 9,042,141 B2 | 3/2015 | Yu et al. |
| 9,065,300 B2 | 6/2015 | Williams |
| 9,093,862 B2 | 7/2015 | Dennis et al. |
| 9,124,119 B2 | 9/2015 | Moehlenkamp et al. |
| 9,154,067 B2 | 10/2015 | Frampton et al. |
| 9,162,690 B2 * | 10/2015 | Kumar ................ B61L 27/0027 |
| 9,190,848 B2 | 11/2015 | Collie |
| 9,190,852 B2 | 11/2015 | Bienfang et al. |
| 9,197,071 B2 | 11/2015 | Williams |
| 9,203,242 B2 | 12/2015 | Wang |
| 9,312,699 B2 | 4/2016 | Taimela et al. |
| 9,394,084 B1 * | 7/2016 | Edwards ............. H02P 29/0243 |
| 9,444,252 B2 | 9/2016 | Bourgeau |
| 9,601,970 B2 | 3/2017 | French et al. |
| 9,660,455 B2 | 5/2017 | Votoupal et al. |
| 9,705,357 B2 | 7/2017 | Apalenek et al. |
| 9,722,426 B2 | 8/2017 | McDaniel et al. |
| 9,812,863 B2 | 11/2017 | Bacque et al. |
| 9,812,866 B2 | 11/2017 | Hunt et al. |
| 9,950,722 B2 * | 4/2018 | Kumar ................ B61L 27/0027 |
| 2001/0052704 A1 * | 12/2001 | Bosley ............... E21B 47/0008 290/52 |
| 2002/0030364 A1 * | 3/2002 | Bosley ..................... F02C 9/56 290/7 |
| 2003/0187553 A1 * | 10/2003 | Dillen .................... F02D 29/02 701/19 |
| 2004/0041404 A1 * | 3/2004 | McConnell ............ F01D 15/10 290/52 |
| 2004/0084965 A1 * | 5/2004 | Welches ................... H02J 3/01 307/64 |
| 2004/0133315 A1 * | 7/2004 | Kumar ................ B61L 27/0027 700/302 |
| 2005/0140142 A1 * | 6/2005 | Welches ................... H02J 3/30 290/41 |
| 2006/0017328 A1 | 1/2006 | Bryde |
| 2006/0163878 A1 * | 7/2006 | Anzioso ................... F02G 5/02 290/2 |
| 2008/0018109 A1 * | 1/2008 | Campanile ............... F02C 6/18 290/2 |
| 2008/0054647 A1 * | 3/2008 | Kumar .................... F02D 41/042 290/40 R |
| 2010/0018203 A1 * | 1/2010 | Richards ................. F01D 15/10 60/598 |
| 2012/0223524 A1 | 9/2012 | Williams |
| 2012/0277940 A1 * | 11/2012 | Kumar ................ B61L 27/0027 701/20 |
| 2013/0269348 A1 * | 10/2013 | Ethier ....................... F02C 3/00 60/722 |
| 2014/0103727 A1 | 4/2014 | Taimela et al. |
| 2014/0130500 A9 * | 5/2014 | Ethier ....................... F02C 3/00 60/722 |
| 2014/0156122 A1 * | 6/2014 | Wiemeyer ............... B61C 17/12 701/19 |
| 2015/0005994 A1 * | 1/2015 | Kumar ................ B61L 27/0027 701/20 |
| 2016/0009304 A1 * | 1/2016 | Kumar ................ B61L 27/0027 701/19 |
| 2016/0109133 A1 * | 4/2016 | Edwards ................... F02C 7/28 60/786 |
| 2016/0185462 A1 * | 6/2016 | Edwards ............. H02P 29/0243 701/34.4 |
| 2018/0252158 A1 * | 9/2018 | Malkamaki ............... F02C 1/06 |
| 2019/0055890 A1 * | 2/2019 | Ethier .................... F02B 37/004 |
| 2019/0190401 A1 * | 6/2019 | Larson ..................... H02M 7/48 |

* cited by examiner

CONTROL OF FUEL FLOW FOR POWER GENERATION BASED ON DC LINK LEVEL

CROSS-REFERENCE TO RELATED APPLICATIONS

This application claims priority to U.S. provisional application Ser. No. 62/461,595, titled "CONTROL OF FUEL FLOW FOR POWER GENERATION BASED ON DC LINK LEVEL," filed Feb. 21, 2017, which is hereby incorporated by reference in its entirety.

FEDERALLY SPONSORED RESEARCH

This invention was made with government support under grant award No. 1256632 awarded by the National Science Foundation. The government has certain rights in the invention.

BACKGROUND

A power generating unit generates electric power for a variety of applications. A power generating unit may consume a type of hydrocarbon fuel and provide a primary source power in residential, commercial, or industrial applications. One example of a power generating unit includes a diesel reciprocating engine connected to an electric generator. The engine generates shaft power and rotates the electric generator. The generator provides electric power. The power generating unit may further condition the electric power, for example using AC-DC converters and/or variable frequency drives (VFDs), before delivering the electric power to one or more loads.

Another example of a power generating unit includes a gas turbine engine that is coupled to an electric generator. The electric power produced by the generator may be further conditioned, for example by AC-DC converters, DC-AC converters, or variable frequency drives.

SUMMARY

A power generating unit, comprising: an engine-generator set, comprising: an engine that produces mechanical power; and a generator coupled to the engine, wherein the generator receives the mechanical power from the engine and converts the mechanical power to a first form of electrical power; a first power converter that receives the first form of electrical power from the generator and converts the first form of electrical power to a second form of electrical power; a DC link that receives the second form of electrical power from the first power converter; an energy storage unit that receives the second form of electrical power from the DC link; and at least one controller configured to control fuel flow to the engine based on a voltage of the DC link.

The power generating unit may further comprise a power delivery unit that receives the second form of electrical power from the DC link, and converts the second form of electrical power to a third form of electrical power, and provides the third form of electrical power as the output of the power generating unit.

The engine that produces mechanical power may be a gas turbine engine.

The gas turbine engine may be a two-shaft gas turbine engine comprising: a compressor; a first turbine that is mechanically coupled to the compressor; and a second turbine that is not mechanically coupled to the compressor or first turbine, wherein gas from the first turbine flows through the second turbine and rotates the second turbine to produce the mechanical power.

The engine that produces mechanical power may be a reciprocating engine.

The generator mechanically coupled to the engine may produce AC electrical power and the first power converter may convert the AC electrical power to DC electrical power that is provided to the DC link.

The first power converter may be an AC-DC converter.

A power delivery unit may convert DC electrical power from the DC link to supply one or more loads.

The power delivery unit may be a DC-AC converter.

A control unit for a power generating unit comprising an engine-generator set including an engine that produces mechanical power and a generator mechanically coupled to the engine, wherein the generator converts the mechanical power to electrical power provided to a DC link, the control unit comprising: at least one controller configured to control fuel flow to the engine based on a voltage of the DC link.

The at least one controller may control fuel flow to the engine by commanding a set point to a fuel control valve.

The at least one controller may be at least a portion of a control loop, wherein: the control loop obtains a signal representing a voltage of the DC link; the control loop commands a set point to a fuel system of the engine based on the signal representing the voltage of the DC link; and the control loop maintains the voltage of the DC link within a specified range of values.

The at least one controller may comprise at least a portion of a plurality of control loops, wherein: a first control loop obtains a signal representing a voltage of the DC link, the first control loop commands an engine speed setpoint, and the first control loop maintains the voltage of the DC link within a specified range of values; and a second control loop obtains the engine speed setpoint, the second control loop commands a set point to a fuel system of the engine, and the second control loop maintains the engine speed at the set point commanded by the first control loop.

The at least one controller may be configured to: control power output from the generator to the DC link to regulate a speed of the generator; and control power output from a power delivery unit to a load to regulate a voltage of the power delivered to the load.

A modular power generating system, comprising: two or more engine-generator sets units each producing a first form of electrical power; first power converters comprising a first power converter for each engine-generator set, each configured to receive a first form of electrical power from its corresponding engine-generator set, and convert the first form of electrical power to a second form of electrical power; a DC link that receives the second form of electrical power from the first power converters; an energy storage unit that receives the second form of electrical power from the DC link; and at least one controller configured to control fuel flow to each engine-generator set based on the voltage of the DC link.

The modular power generating system may further comprise one or more power delivery units, each configured to receive the second form of electrical power from the DC link, convert the second form of electrical power to a third form of electrical power, and provide the third form of electrical power as the one or more outputs of the modular power generating system.

At least one of the engine-generator sets may comprise a gas turbine engine.

At least one of the engine-generator sets may comprise a two-shaft gas turbine engine comprising: a compressor; a first turbine that is mechanically coupled to the compressor; and a second turbine that is not mechanically coupled to the compressor or first turbine, wherein gas from the first turbine flows through the second turbine and rotates the second turbine to produce mechanical power.

At least one of the engine-generator sets may comprise a reciprocating engine.

At least one of the engine-generator sets may produce AC electrical power and each first power converter converts the AC electrical power to DC electrical power that is provided to the DC link.

A power generation system, comprising: an engine-generator set including: an engine that produces mechanical power; and a generator mechanically coupled to the engine, wherein the generator converts the mechanical power to electrical power, wherein the electrical power is provided to a DC link, and the power generation system further comprises: a controller configured to control fuel flow to the engine based on a voltage of the DC link.

The engine that produces mechanical power may be a gas turbine engine.

The engine that produces mechanical power may be a reciprocating engine.

The engine that produces mechanical power may be a diesel-fueled engine.

The engine that produces mechanical power may be a two-shaft gas turbine engine comprising: a compressor; a core turbine that is mechanically coupled to the compressor; and a power turbine that is not mechanically coupled to the compressor or core turbine, wherein gas from the core turbine flows through the power turbine and rotates the power turbine to produce the mechanical power.

The generator mechanically coupled to the engine may produce AC electrical power and a power converter may convert the AC electrical power to DC electrical power that is provided to the DC link.

The power generation system may further comprise a first power converter that converts electrical power from the generator to DC electrical power that is provided to the DC link, and controls a characteristic parameter of the engine-generator set; and an energy storage device that is electrically connected to the DC link.

The first power converter may be an AC-DC converter.

The energy storage device may be directly connected to the DC link and there may no additional power converter between the DC link and the energy storage device.

The first power converter may control generator speed.

The power generation system may further comprise a power converter that converts DC electrical power from the DC link to supply one or more loads.

The power converter may be a DC-DC converter.

The power converter may be a DC-AC converter.

The power converter may control output voltage and frequency.

The loads may comprise one or more electric motors.

A control unit for a power generation system comprising an engine-generator set including an engine that produces mechanical power and a generator mechanically coupled to the engine, wherein the generator converts the mechanical power to electrical power provided to a DC link, the control unit comprising: a controller configured to control fuel flow to the engine based on a voltage of the DC link.

The controller may fuel flow to the engine by commanding a set point to a fuel control valve.

The controller may be at least a portion of a control loop, wherein: the control loop obtains a signal representing a voltage of the DC link; the control loop commands a set point to a fuel system of the engine based on the signal representing the voltage of the DC link; and the control loop maintains the voltage of the DC link within a specified range of values.

The controller may comprise at least a portion of a plurality of control loops, wherein: a first control loop obtains a signal representing a voltage of the DC link, the first control loop commands a set point of a parameter of the engine, and the first control loop maintains the voltage of the DC link within a specified range of values; and a second control loop obtains the setpoint of a parameter of the engine, the second control loop commands a set point to a fuel system of the engine, and the second control loop maintains the parameter of the engine at the set point commanded by the first control loop.

The parameter of the engine may be the speed.

A power generation system, comprising: a first engine-generator set including: a first engine that produces first mechanical power; and a first generator mechanically coupled to the first engine, wherein the first generator converts the first mechanical power to first electrical power, wherein the first electrical power is provided to a common DC link; a second engine-generator set including: a second engine that produces second mechanical power; and a second generator mechanically coupled to the second engine, wherein the second generator converts the second mechanical power to second electrical power, wherein the second electrical power is provided to the common DC link, and the power generation system further comprises: at least one controller configured to control fuel flow to the first engine and the second engine based on a voltage of the common DC link.

The first engine may be a gas turbine engine.

The first engine may be a reciprocating engine.

The first engine may be a diesel-fueled engine.

The first engine may be a two-shaft gas turbine engine comprising: a compressor; a core turbine that is mechanically coupled to the compressor; and a power turbine that is not mechanically coupled to the compressor or core turbine, wherein gas from the core turbine flows through the power turbine and rotates the power turbine to produce the mechanical power.

The first generator may produce AC electrical power and a power converter may convert the AC electrical power to DC electrical power that is provided to the common DC link.

The power generation system may further comprise a first power converter that converts electrical power from the first generator to DC electrical power that is provided to the common DC link, and controls a characteristic parameter of the first engine-generator set; and an energy storage device that is electrically connected to the common DC link.

The first power converter may be an AC-DC converter.

The energy storage device may be directly connected to the common DC link and there may be no additional power converter between the common link and the energy storage device.

The first power converter may control a speed of the first generator.

The power generation system may further comprise a power converter that converts DC electrical power from the common DC link to supply one or more loads.

The power converter may be a DC-DC converter.

The power converter may be a DC-AC converter.

The power converter may control output voltage and frequency.

The loads may comprise one or more electric motors.

A control unit for a power generation system comprising a first engine-generator set including a first engine that produces first mechanical power and a first generator mechanically coupled to the first engine, wherein the first generator converts the first mechanical power to first electrical power, wherein the first electrical power is provided to a common DC link, the power generation system further comprising a second engine-generator set including a second engine that produces second mechanical power and a second generator mechanically coupled to the second engine, wherein the second generator converts the second mechanical power to second electrical power, wherein the second electrical power is provided to the common DC link, the control unit comprising: at least one controller configured to control fuel flow to the first engine and the second engine based on a voltage of the common DC link.

The at least one controller may controls fuel flow to the first engine by commanding a set point to a fuel control valve.

The at least one controller may be at least a portion of a control loop, wherein: the control loop obtains a signal representing a voltage of the common DC link; the control loop commands a set point to a fuel system of the first engine based on the signal representing the voltage of the common DC link; and the control loop maintains the voltage of the common DC link within a specified range of values.

The at least one controller may comprise at least a portion of a plurality of control loops, wherein: a first control loop obtains a signal representing a voltage of the common DC link, the first control loop commands a set point of a parameter of the first engine, and the first control loop maintains the voltage of the common DC link within a specified range of values; and a second control loop obtains the setpoint of a parameter of the first engine, the second control loop commands a set point to a fuel system of the first engine, and the second control loop maintains the parameter of the first engine at the set point commanded by the first control loop.

The parameter of the first engine may be a speed of the first engine.

A power generation system, comprising:
an apparatus that converts fuel into electrical power and provides the electrical power to a DC link; and a controller configured to control fuel flow to the apparatus based on an energy storage level of the DC link.

The apparatus may comprise a fuel cell or an engine-generator set.

The apparatus may comprise a fuel cell and the power generation system further comprises a DC-DC converter that converts first DC power from the fuel cell into second DC power that is supplied to the DC link.

The energy storage level of the DC link may be a voltage of the DC link.

A control unit for a power generation system comprising an apparatus that converts fuel into electrical power and provides the electrical power to a DC link, the control unit comprising: a controller configured to control fuel flow to the engine based on an energy storage level of the DC link.

A power generation system, comprising: a first apparatus that converts fuel into first electrical power and provides the first electrical power to a common DC link; a second apparatus that converts fuel into second electrical power and provides the second electrical power to the common DC link; and at least one controller configured to control fuel flow to the first apparatus and the second apparatus based on an energy storage level of the DC link.

The first apparatus may comprise a fuel cell or an engine-generator set and the second apparatus comprises a fuel cell or an engine-generator set.

A control unit for a power generation system comprising a first apparatus that converts fuel into first electrical power and provides the first electrical power to a common DC link and a second apparatus that converts fuel into second electrical power and provides the second electrical power to the common DC link, the control unit comprising: at least one controller configured to control fuel flow to the first apparatus and the second apparatus based on an energy storage level of the DC link.

A power generation method, comprising: converting fuel into electrical power using a power generating apparatus; providing the electrical power to a DC link; and controlling fuel flow to the apparatus based on an energy storage level of the DC link.

A power generation method, comprising: converting fuel into first electrical power using a first power generating apparatus; converting fuel into second electrical power using a second power generating apparatus; providing the first and second electrical power to a common DC link; and controlling fuel flow to the first power generating apparatus and the second power generating apparatus based on an energy storage level of the DC link.

A power generating unit, comprising: a power production unit that produces a first form of electrical power a first power converter that receives the first form of electrical power from the power production unit and converts the first form of electrical power to a second form of electrical power, an energy storage unit that receives the second form of electrical power from the first power converter, a power delivery unit that receives the second form of electrical power from the energy storage unit and converts the second form of electrical power to a third form of electrical power, a sensor that measures a parameter of the power generating unit that is related to the mismatch between the power generated by the power production unit and the power delivered by the power delivery unit, and a controller configured to control the power output of the power production unit based on the measured parameter.

A control system for the power generating unit of claim 9, the control system comprising: a first controller that controls power output from the power production unit to the energy storage unit to regulate one parameter of the power production unit, a second controller that controls power output from the power delivery unit to the load to regulate the voltage of the power delivered to the load, and a third controller that controls an input into the power production unit to regulate the measured parameter that indicates mismatch between power generated by the power production unit and the power delivered by the power delivery unit, wherein said input modulates the power output of the power production unit.

A modular power generating system, comprising: two or more power production units each producing a first form of electrical power, one first power converter for each power production unit, each receives a first form of electrical power from its corresponding power production unit, and converts the first form of electrical power to a second form of electrical power, an energy storage unit that receives the second form of electrical power from all power production units, one or more power delivery units, each receives the second form of electrical power from the energy storage unit, and converts the second form of electrical power to a third form of electrical power, and provides the third form of electrical power as the one or more outputs of the power generating unit and a controller configured to control an input to each power production unit based on a measured parameter that indicates mismatch between power generated by the power production unit and the power delivered by the power delivery unit, wherein the input into each power production unit modulates the power output of that power production unit.

A control system for s modular power generating system, the control system comprising: a first controller for each first power converter that controls power output from its power production unit to the energy storage unit to regulate one parameter of its power production unit, a second controller for each power delivery unit that controls power output from its power delivery unit to the load to regulate the voltage of the power delivered to the load, and a third controller that controls an input to each power production unit based on a measured parameter that indicates mismatch between power generated by the power production unit and the power delivered by the power delivery unit, wherein the input into each power production unit modulates the power output of that power production unit.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Figure 1:
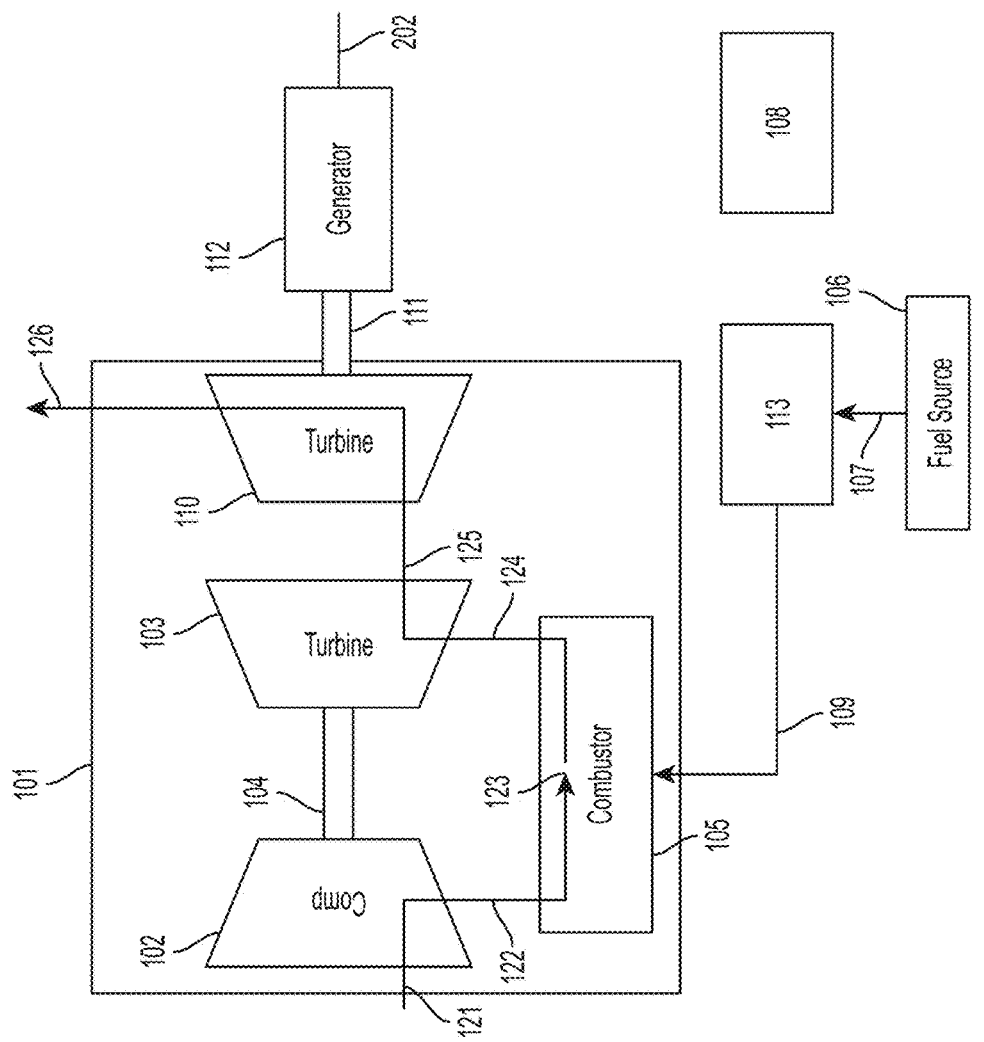
FIG. 1 gas turbine engine and generator

There is a need to control a power generating unit more effectively to respond to fuel changes and load changes. One application that needs such a power generating unit is the application of providing power to equipment at oil production sites using associated petroleum gas. The fuel quality is not tightly controlled, and the load can vary suddenly or periodically as a result of the pumping process.

Fuel quality affects stability of the engine within the power generating unit, and it is common for engines to shut down because the engine cannot handle the fuel when the composition changes. Some engines can be tuned to handle different fuels, but the effectiveness depends on the site location and the engine type. The effectiveness also can degrade over time because the fuel quality changes over time. Load change also affects engine stability, and additionally affects power quality. A large sudden increase in load will at least cause a drop in power output voltage and frequency, and may often cause an undersized engine to stall. These peak loads are often much higher (3 to 10 times) than the average load power draw. Typically the site engineer needs to use a severely oversized engine just to meet brief periods of peak loads. In terms of power quality, sudden drops in power output voltage and frequency can adversely affect the performance of the loads, such as electric motors, and may also cause mechanical wear on the loads. A power generating unit that can better handle changes in fuel quality or load can be used in a variety of industrial applications to reliably provide heat and power using fuels that are not well-refined. This can help reduce operating costs and greenhouse gas emissions in many applications where unprocessed fuel is available at little to no cost.

There is also a need for a more modular power generating system, especially for customers who want to reduce capital costs and operating costs by more efficiently managing their assets. For example in the oil field, operator want to be able to move engine-generator sets and/or variable frequency drives out of a well as the load drops over time, and install them at newer wells that require more power.

Disclosed herein is a power generating unit and a control system that controls the power generating unit.

The power generating unit contains a power production unit, such as an engine-generator set, that produces power, a power delivery unit, such as a DC-AC converter, that delivers power to a load, and an energy storage unit that isolates the power production unit from the load, allowing the power generating unit to respond more effectively to transients in either the load or the environmental conditions, such as ambient temperature, ambient pressure, fuel pressure, and fuel quality. When the load suddenly increases, the power production unit, such as an engine-generator set, initially does not produce enough power to meet the load. During this transient period, the energy storage unit can provide the additional power necessary for the power delivery unit to meet the load immediately, while the power production unit ramps up more slowly to eventually supply enough power for the load without the help of the energy storage unit.

The control system evaluates the amount of energy stored in the energy storage unit, and controls the power production unit output to maintain the amount of stored energy. In the case where the energy storage unit is an ultra-capacitor bank, the control system evaluates the ultra-capacitor bank voltage as an indicator of the amount of stored energy. In the case where the power production unit is an engine-generator set, the control system controls fuel flow into the engine-generator set to maintain a desired DC link voltage.

The control system disclosed herein can handle transients effectively in the case of either fuel quality changes or load changes. The control system does not need to know which type of perturbation is causing a transient in the response of the power generating unit. The control system is more robust and less complex because it handles both types of perturbations using the same control scheme. In the case where the power production unit is an engine-generator set, the engine-generator set should be fuel flexible such that the combustion system itself can remain stable with different fuels being burned.

An additional control loop can be nested within the main engine-generator set control system to recognize differences between fuel changes and load changes. In one embodiment, an outer control loop regulates DC link voltage by modulating an engine speed setpoint, and an inner control loop the engine speed to this speed setpoint by modulating the fuel flow.

The control system described herein allows the power generating unit to support rapid transients without any measurement of the load itself, any predictions of anticipated load changes, or any feed-forward control logic based on anticipated load changes. The control system also does not need any measurement of the environmental conditions, such as ambient temperature, ambient pressure, fuel pressure, and fuel composition, to support rapid transients in these environmental conditions.

Also disclosed herein is a modular power generating system containing multiple power production units, such as engine-generator sets, connected together at a DC bus. This provides flexibility and increased modularity. Different sized engine-generator sets can be connected together on one end of the DC bus, and different sized and number of power delivery units, such as DC-AC converters or variable frequency drive, can be connected together on the other end of the DC bus. The engine-generator sets can be selected to meet the load profile. The load may consist of a base load and fluctuations that may be a small fraction of the base load. Using the techniques described herein, the power generating system may comprise a large engine-generator set to meet the base load, and a smaller engine-generator set to respond to fluctuations. The load might be generated by a large number of individual loads, such as a multi-well oil pad where each well has a pump. As an example, here the user can have two engine-generator sets to provide power to five variable frequency drives that drive the five motors. The customer can properly size the generators for the total nominal power draw of the loads. Having separate variable frequency drives helps to isolate the loads from each other, so suddenly turning on a large load will not affect power quality in the other loads.

Connecting engine-generator sets at the AC bus might appear to allow for better modularity, but that is not necessarily the case. From the product development side, connecting them at the AC bus is simpler because it divides the development tasks (and subsequently product architecture) into individual engine development and AC bus control development. However, modern day customers require even greater modularity especially in terms of asset management. Customers want to move generators and/or power electronics around to satisfy the application as demands change over time. The present disclosure proposes a method of connecting engines at the DC bus, which provides flexibility in terms of both engine deployment and power conversion deployment.

Power Generating Unit

Disclosed herein is a power generating unit and a control system that controls the power generating unit. The power generating unit contains an energy storage unit that isolates the engine from the load, allowing the power generating unit to respond more easily to transients in either the load or the environmental conditions, including ambient temperature, ambient pressure, fuel pressure, and fuel quality.

In some embodiments disclosed herein, a power generating unit includes the following components: an engine that generates mechanical power, a generator that receives mechanical power from the engine and converts mechanical power to a first form of electrical power, a first power converter that receives a first form of electrical power from the generator and converts it to a second form of electrical power that is suitable for energy storage, and an energy storage unit that accepts a second form of electrical power from the first power converter. The combination of engine and generator may be referred to as an engine-generator set, or genset for short. The power generating unit may also have a power delivery unit that takes a second form of electrical power from the energy storage unit and converts it to a third form of electrical power that the end user can use.

A first embodiment of a power generating unit includes the following components: an engine-generator set comprising a gas turbine engine and a high-speed permanent magnet electrical generator, an AC/DC converter (also called rectifier) that converts generator AC output to DC, an ultra-capacitor bank that stores energy from the AC/DC converter, a DC/AC converter (also called inverter) that converts DC power from the energy storage unit to AC power for the end user.

FIG. 1 shows one embodiment of an engine-generator set. The gas turbine engine (101) includes a compressor (102) and a first turbine (103) connected by a first turbine shaft (104), a combustor (105), a second turbine (110) that is not mechanically connected to the first turbine (103), a fuel system (113), and a control system (108). The first turbine (103) may also be called a core turbine. The second turbine (110) may also be called a power turbine. The gas turbine engine takes air in from ambient (121), compressing it through the compressor (102) such that the air leaving the compressor (122) is at a higher pressure, and sends this high pressure air (122) into the combustor (105). At the same time, the fuel system (113) takes in fuel (107) from a fuel source (106). Examples of a suitable fuel source for a gas turbine engine may be a propane tank or a gas pipeline. The fuel is injected (109) into the combustor (105), mixes with the high pressure air (122) coming from the compressor (102), and is ignited inside the combustor at the air-fuel mixing point (123). The igniter is a part of the combustor and is not shown separately in FIG. 1. The resulting gas after combustion (124) is high pressure and high temperature, enters the first turbine (103), and imparts power to the first turbine. This power is directly transferred to the compressor (102) through the common first turbine shaft (104) and provides mechanical power to sustain the compression. The gas leaving the first turbine (125) is lower pressure than before but still higher pressure than ambient, and is lower temperature than before but still higher temperature than ambient. This gas enters the second turbine (110) and imparts more power to the second turbine, which generates mechanical shaft power. The gas subsequently leaves the second turbine and is exhausted (126) typically to ambient. The second turbine is connected to a high speed permanent magnet generator (112) by a second turbine shaft (111). The mechanical shaft power generated by the second turbine (110) is converted to electrical power (202) by the generator (112). A permanent magnet generator may produce polyphase AC electrical power, but the techniques described herein does not limit the engine-generator set to use high speed permanent magnet generators. Other types of generators, including induction, AC, or DC, may also be used.

Figure 2:
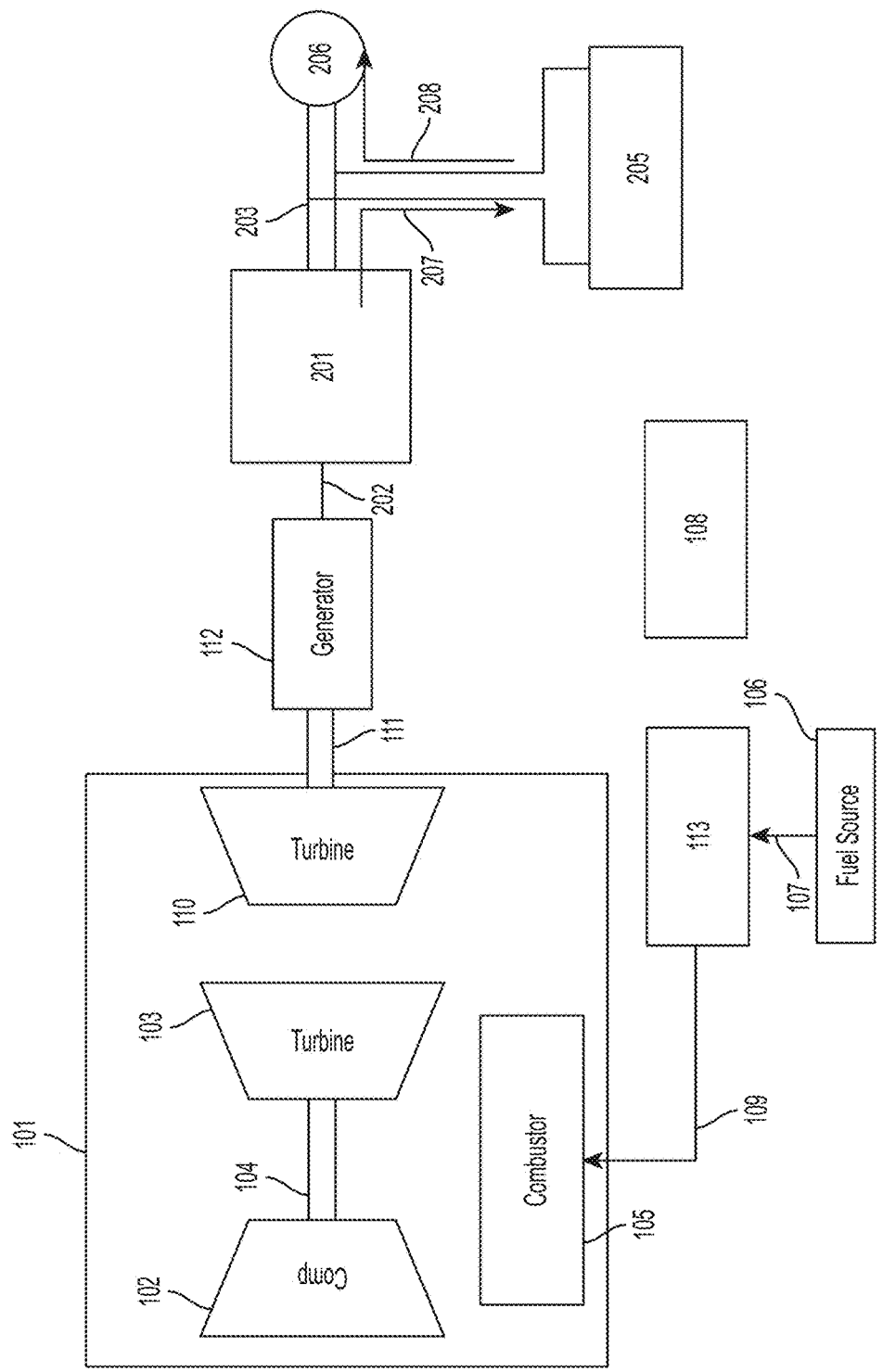
FIG. 2 power generating unit including a gas turbine engine, generator, first power converter, DC link, and energy storage unit FIG. 3 power generating unit including a gas turbine engine, generator, first power converter, DC link, energy storage unit, and power delivery unit FIG. 4 control system of a power generating unit FIG. 5A transient behavior of power generating unit under sudden load changes FIG. 5B transient behavior of power generating unit under sudden load changes without allowing the power generating unit to reach steady state.

After the generator outputs a first form of electrical power, this power may be subsequently converted to a second form of electrical power that can be stored in an energy storage unit. FIG. 2 shows one embodiment of a power generating unit with a first power converter and an energy storage unit. An AC-DC converter (201) receives a first form of AC electrical power (202) from the generator (112) and converts this power to DC power that is made available at a DC link (203). The power at the DC link (203) can be delivered directly to a load (206) in some applications. An energy storage unit (205) is connected in parallel with the DC link (203). In this embodiment, the energy storage unit (205) is an ultra-capacitor. In general, the energy storage unit may be a different type of device such as a flywheel, or combinations of different types of devices. The energy storage unit (205) increases the ability of the power generating unit to rapidly respond to transients in the load (206) or in environmental conditions, such as ambient pressure, ambient temperature, fuel pressure, and fuel quality. The energy storage unit power flow is bi-directional. In case of an ultra-capacitor energy storage unit, no additional equipment and no active control is required to implement bi-directional power flow into and out of the energy storage unit. Power may flow (207) from the AC-DC converter (201) into the energy storage unit (205) if the power from the gas turbine engine exceeds the power demanded from the load (206). Power may flow (208) from the energy storage unit (205) to the load (206) if the power from the gas turbine engine is insufficient to fully supply the load (206). The embodiment described in FIG. 2 includes a one-directional AC-DC converter (201) that receives power (202) from the generator and delivers power (203) to the DC link, but the embodiments described herein are not limited to using a one-directional AC-DC converter. The AC-DC converter (201) may also be bi-directional, in which case the AC-DC converter (201) may receive power from a DC source, such as the energy storage unit (205) or a battery bank, and transmit power to the generator (112) to turn the generator (112) when first starting the gas turbine engine.

Figure 3:
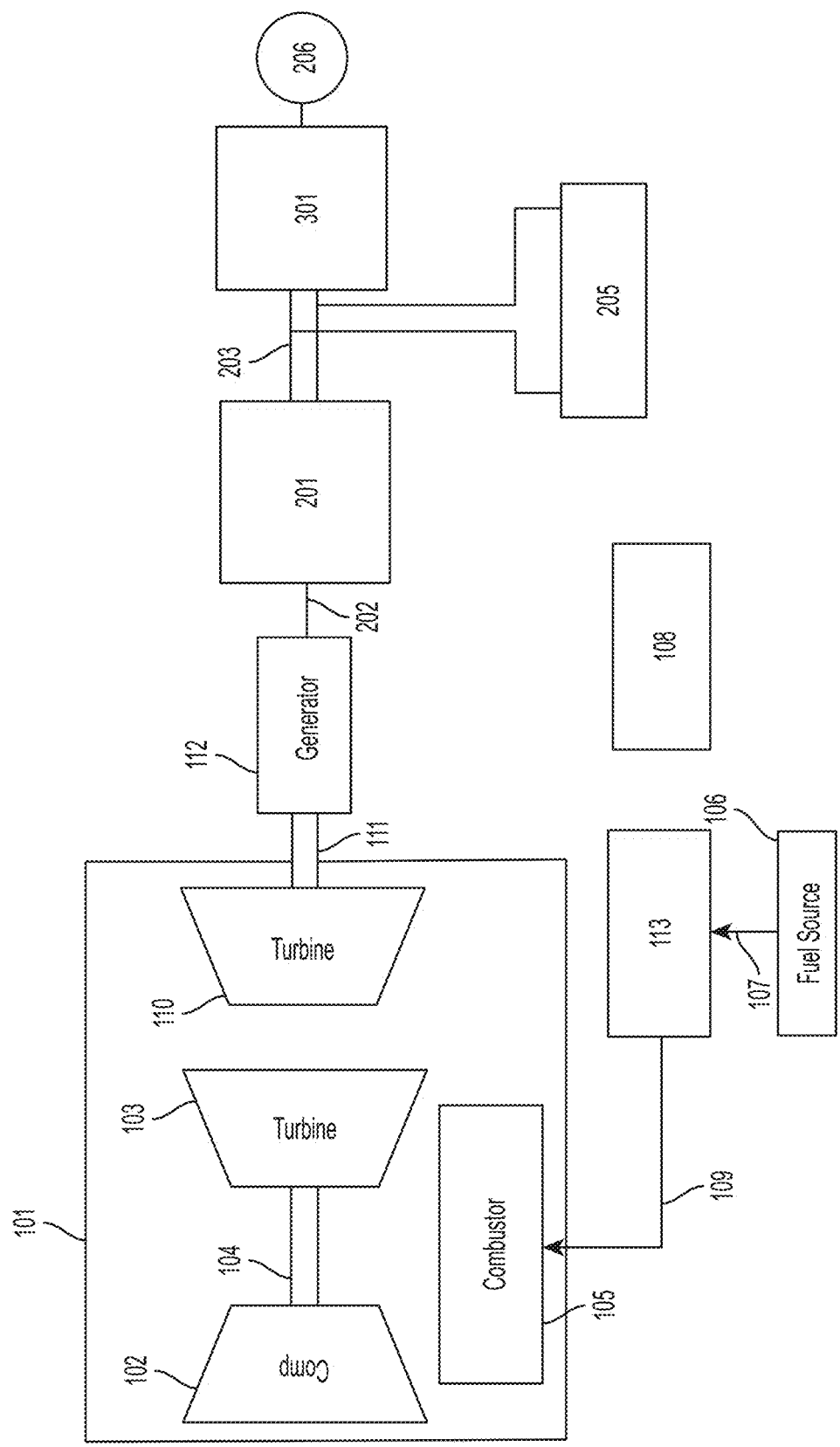

Additional power conditioning may be needed after the DC link for many types of loads, including motors requiring AC power and devices requiring DC power with a regulated voltage. A power delivery unit may be added to the DC link to achieve the additional power conditioning. FIG. 3 shows one embodiment of a power generating unit further comprising a power delivery unit. The power delivery unit (301) receives power from the DC link (203) and converts DC power to another form that is more suited for a particular load in a particular application. This power is then delivered to the load (206). The load may be a simple resistive load, or it may be inductive or capacitive, or any combination of the 3 types. The power delivery unit (301) may be a DC-AC converter that receives power from the DC link (203) and converts DC power to AC power that is then delivered to the load (206). Many commercial and industrial applications typically use AC power to drive loads. For example, in the United States AC power may be 120V single phase 60 Hz, 240V split phase 60 Hz, or 480V 3-phase 60 Hz. In these applications, the DC-AC converter may be configured to tightly control both voltage and frequency to fixed values determined by the application, and deliver the necessary electrical current to drive the load. In some applications, the load may be regenerative and a bi-directional power delivery unit may be installed such that the energy flowing back from the load may be stored in the energy storage unit (205).

The power delivery unit may also be a DC-DC converter, which may be configured to tightly control DC output voltage. One application that may use this configuration is a power generating unit that provides power with a controlled DC voltage to a pipeline for cathodic protection.

The power delivery unit may also be a variable frequency drive (VFD) that receives DC power from the DC link and controls both the voltage and frequency of the output AC power. Typical commercial off the shelf VFDs receive AC power, rectifies it to DC power, and then converts it again to AC power of the desired voltage and frequency. However, a VFD may also connect directly to a DC voltage source. This configuration executes one fewer power conversion step than a typical commercial off the shelf VFD, and the electrical efficiency will be higher as a result. Another advantage of having a VFD built into the power generating unit is to allow the control system of the power generating unit to control the load, which may be advantageous for managing potential overload situations in applications where uptime is critical. For example, if the load on a motor increases above the capacity of the power generating unit, the control system may reduce the speed of the motor to reduce the load. Without this capability, the power generating unit is likely to stall and shutdown. There are many applications, such as remote oil and gas sites, in which running the load at partial power is better than shutting down the load completely.

Control System for Power Generating Unit

Figure 4:
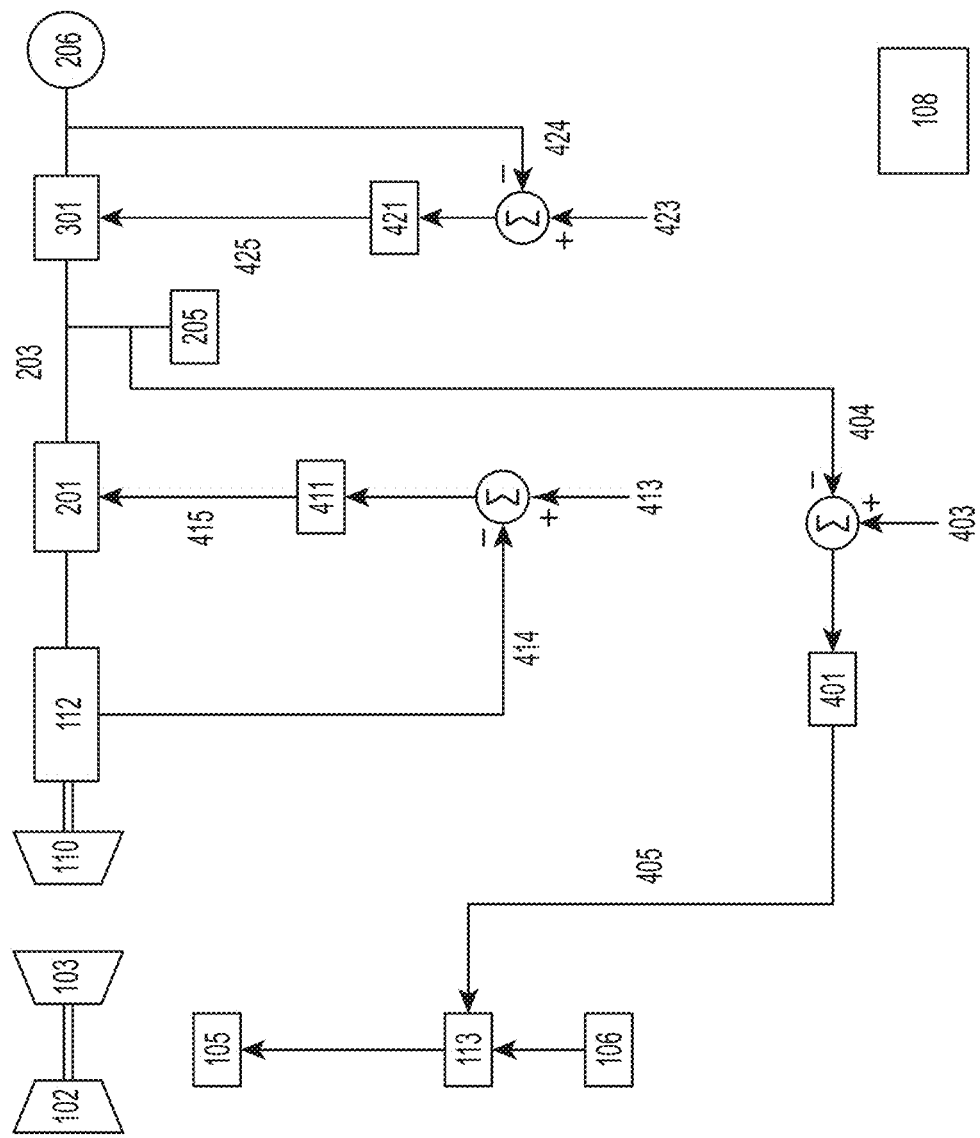

FIG. 4 describes a control system for a power generating unit. The power generating unit has the following main components. The gas turbine engine includes a compressor (102) connected to a first turbine (103), a combustor (105), and a second turbine (110). The second turbine (110) of the gas turbine engine is connected to a generator (112). The gas turbine engine and generator form an engine-generator set.

A fuel system (113) delivers fuel from a fuel source (106) to the combustor (105). The gas turbine engine uses the fuel to produce mechanical shaft power at the power turbine (110). This shaft power is converted to electric power at the generator (112). This electric power is further converted to DC power by a first power converter (201), in this case an AC-DC converter, and the DC power is made available at the DC link (203). An energy storage unit (205) is connected in parallel with the DC link (203). A power delivery unit (301) converts DC power from the DC link to a power more suited for the load (206).

The control system (108) includes various control loops that control various components of the power generating unit. There are three distinct control loops shown in FIG. 4.

The first power converter controller (411), in this case an AC-DC converter controller governs the speed of the generator (112). A pre-determined generator speed set point (413) is communicated to the AC-DC converter (412). This set point may stay constant during engine operation or may be variable. The AC-DC converter controller evaluates the measured generator speed (414), and sends control signal (415) to the AC-DC converter (201). The control signal (415) commands the AC-DC converter to deliver an amount of power from the generator (112) to the DC link (203) in order to maintain the generator speed (414) at the speed set point (413). High speed power electronics in the AC-DC converter may regulate generator speed (414) very effectively, such that deviations between generator speed (414) and the speed set point (413) may be lower than 1%. The AC-DC converter does not control for DC voltage output or DC current output. The output voltage of the AC-DC converter matches the existing voltage at the DC link (203) and the output current is the amount needed to maintain the generator speed (414) at the desired set point (413). The capacitance of the energy storage unit (205) may be much higher than the output capacitance of the AC-DC converter and the input capacitance of the power delivery unit, in which case the voltage at the DC link (203) will be determined primarily by the state of the energy storage unit (205).

The power delivery unit controller (421) governs the power delivered to the load (206). The power delivery unit controller (421) receives a pre-determined output voltage set point (423). The power delivery unit controller evaluates the measured output voltage (424), and sends control signal (425) to the power delivery unit (301). The control signal (425) commands the power delivery unit (301) to output an amount of power to the load such that the output voltage (424) is maintained at the desired set point (423). In the case that the power delivery unit (301) is a DC-AC converter, the frequency of the output is also measured and controlled to a frequency set point. Typically frequency is controlled to a fixed value of either 50 Hz or 60 Hz. In the case that the power delivery unit (301) is a VFD, the frequency of the output is controlled to the desired frequency set point, which may vary over time depending on the particular application. In all cases, voltage and frequency set points are determined by the load in the application.

The fuel controller (401) governs the amount of fuel delivered to the combustor (105). The fuel controller (401) evaluates the measured the DC link voltage (404), and compares that to a DC link voltage set point (403). The fuel controller sends control signal (405) to the fuel system (113). The control signal (405) commands the fuel system (113) to vary the amount of fuel delivered to the combustor (105) in order to maintain the DC link voltage near the DC link voltage set point (403).

The fuel controller (401) may be, but is not limited to, a PID controller. Furthermore, the fuel controller (401) may be a slow-acting controller that allows relatively large deviations between the DC link voltage setpoint (403) and the actual DC link voltage (404). For example, the voltage setpoint may be 350V, but the fuel control loop may allow the actual DC link voltage to be anywhere between 250V and 480V. For many applications, it is advantageous to allow this deviation in the DC link voltage from the nominal setpoint because it reduces the speed at which the gas turbine engine needs to respond to changes in the load or the environmental conditions. The slower response time helps to reduce mechanical and thermal stress on the gas turbine engine components. For a given energy storage capacity, increasing engine response speed means less power flow into and out of the energy storage unit, which means smaller deviations in DC link voltage from the nominal setpoint. By allowing for a larger deviation from nominal setpoint, the engine may respond slower to changes.

Figure 5A:
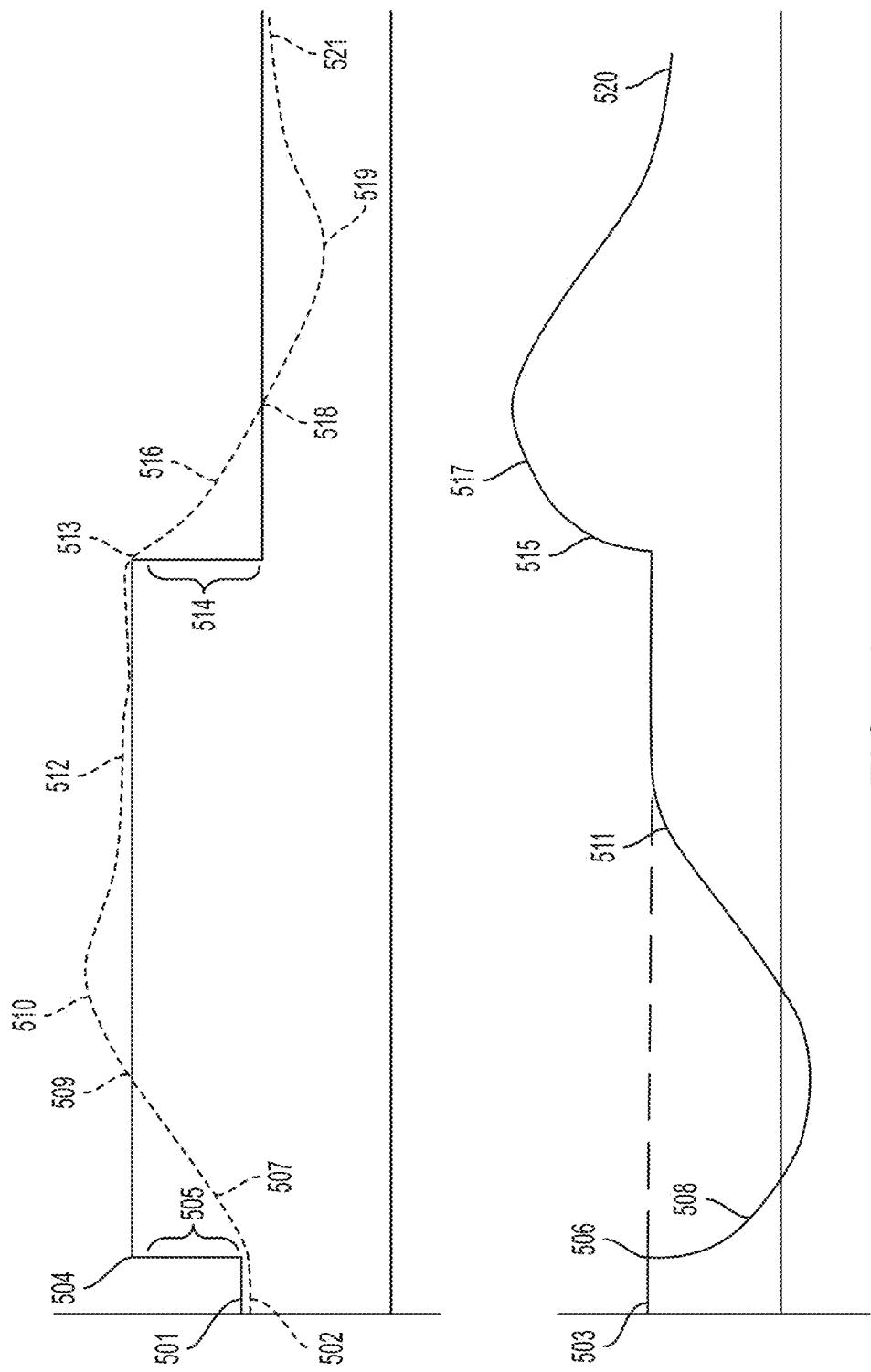
FIG. 5C transient behavior of power generating unit under sudden load changes when the control system controls both the fuel input into the engine and the frequency output of the VFD FIG. 6 control system of a power generating unit having nested controllers for the engine-generator set fuel control FIG. 7A transient behavior of power generating unit in response to load change FIG. 7B transient behavior of power generating unit in response to fuel change FIG. 8A one embodiment of a power electronics system of a power generating unit including black start and auxiliaries FIG. 8B another embodiment of a power electronics system of a power generating unit including black start and auxiliaries FIG. 9A another embodiment of a power electronics system of a power generating unit including black start and auxiliaries FIG. 9B state of the power electronic system of FIG. 9A during black start FIG. 9C state of the power electronics system of FIG. 9A when the gas turbine engine begins charging the ultracapacitor FIG. 9D state of the power electronics system of FIG. 9A when the gas turbine engine begins exporting power to the DC link FIG. 9E state of the power electronics system of FIG. 9A when the gas turbine engine provides all of the power required to run auxiliary systems FIG. 9F state of the power electronics system of FIG. 9A when the gas turbine engine provides all of the power required to run auxiliary systems, charge the battery, and power the load FIG. 10 a generalized power generating unit that uses an energy storage unit as a buffer to separate the power delivery from power production FIG. 11 a control system for the generalized power generating unit of FIG. 10

FIG. 5A describes the transient behavior of the power delivered to the load (501), the power produced by the engine-generator set (502), and the DC link voltage (503). Note that the drawing is not to scale.

At the left side of FIG. 5A, the power generating unit is in steady state and the gas turbine engine generates enough power to supply the load. The load is suddenly increased at 504. The gas turbine engine has not been commanded to spool up to meet the load, but the power delivery unit meets the load immediately by using the energy storage unit to make up for the power deficiency (505). The energy storage unit drains and causes the voltage to drop at the DC link (506). At this point, the fuel controller sees a drop in voltage and commands more fuel into the combustor. This spools up the gas turbine engine and the engine starts producing more power (507). This slows down the drop in DC link voltage (508) because the energy storage unit is being drained less quickly. Eventually the gas turbine engine meets the load (509) without needing any power from the energy storage unit. The fuel controller will further increase fuel to the gas turbine engine such that the gas turbine engine power output exceeds that of the load (510) in order to charge up the energy storage unit back to nominal DC link voltage. As the energy storage unit recharges, as indicated by the DC link voltage returning to nominal (511), the fuel controller will reduce fuel to the gas turbine engine such that the gas turbine engine power output matches that of the load (512).

A similar but opposite behavior occurs when the load is suddenly dropped. The load is suddenly reduced at 513. The gas turbine engine has not been commanded to spool down to meet the load, but the power delivery unit meets the load immediately by using the energy storage unit to store the excess power (514). The energy storage unit fills up and causes the voltage to rise at the DC link (515). At this point, the fuel controller sees a rise in voltage and commands less fuel into the combustor. This spools down the gas turbine engine and the engine starts producing less power (516). This slows down the rise in DC link voltage (517) because the energy storage unit is being filled less quickly. Eventually the gas turbine engine meets the load (518) without needing any power from the energy storage unit. The fuel controller will further reduce fuel to the gas turbine engine such that the gas turbine engine power output is lower than that of the load (519) in order to drain the energy storage unit back to nominal DC link voltage. As the energy storage unit drains, as indicated by the DC link voltage returning to nominal (520), the fuel controller will increase fuel to the gas turbine engine such that the gas turbine engine power output matches that of the load (521).

Figure 5B:
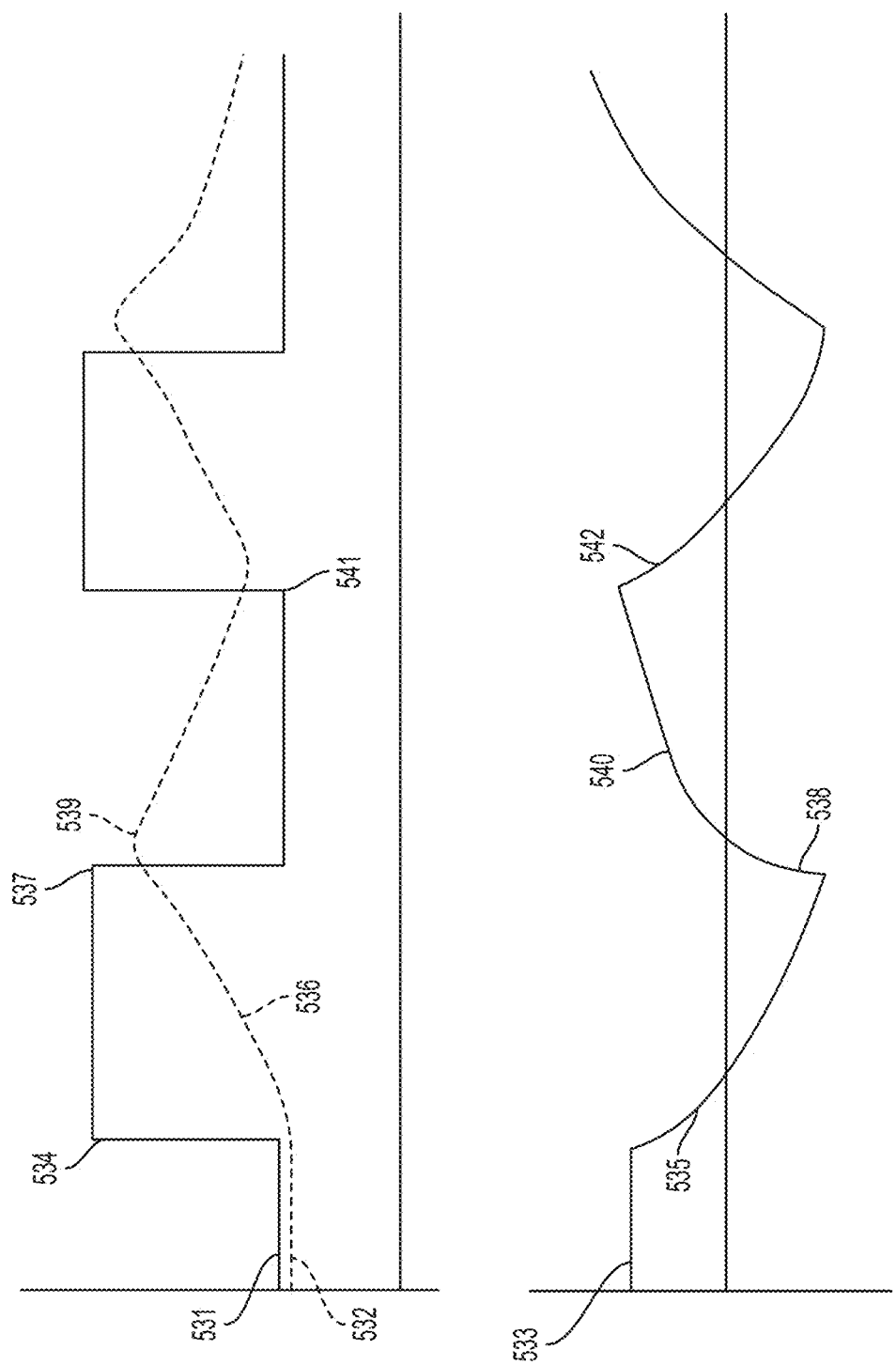

FIG. 5A describes the behavior of the power generating unit and control system from perturbation in load to steady state, but the parameters do not need to reach steady state for the control system to properly address transients in the load. FIG. 5B describes the transient behavior of the power delivered to the load (531), the power produced by the engine-generator set (532), and the DC link voltage (533) under rapid changes in load without allowing any of the parameters to reach steady state. Note that the drawing is not to scale. At the left side of FIG. 5B, the power generating unit is in steady state and the gas turbine engine generates enough power to supply the load. The load is suddenly increased at 534. The gas turbine engine has not been commanded to spool up to meet the load, but the power delivery unit meets the load immediately by using the energy storage unit to make up for the power deficiency. The energy storage unit drains and causes the voltage to drop at the DC link (535). At this point, the fuel controller sees a drop in voltage and commands more fuel into the combustor. This spools up the gas turbine engine and the engine starts producing more power (536). This slows down the drop in DC link voltage (508) because the energy storage unit is being drained less quickly. Right before 537, the engine has not caught up to the load, as shown by the engine power being lower than the load. At 537, the load is suddenly reduced, and the engine is now producing more power than the load is consuming, so the excess power is stored in the energy storage unit and the DC link voltage rises (538). The control system then begins to reduce engine power output (539), which slows down the rise in DC link voltage (540). Right before 541, the engine has not caught up to the load, as shown by the engine power being higher than the load. At 541, the load is suddenly increased, and the engine is now producing less power than the load is consuming, so the energy storage unit makes up for the shortage and the DC link voltage falls (542). The behavior at this point is similar to the behavior at point 534. The cyclic behavior can repeat indefinitely if the load cycles indefinitely in the same pattern.

The energy storage unit is tied directly to the DC link, and the DC link is deliberately allowed to deviate from a nominal value based on the charging and draining of the energy storage unit. Because the DC link voltage is variable, the AC-DC converter should be able to deliver power to the DC link over a range of voltages, the power delivery unit should be able to receive power from the DC link over a range of voltages, and the energy storage unit should be able to deliver power to or receive power from the DC link over the desired range of voltages. In one embodiment, the power delivery unit may receive 250-432 VDC input, so the DC link voltage in the power generating unit may only vary between 250 VDC and 432 VDC. In another embodiment, the power delivery unit may receive 250-500 VDC input, but the capacitor bank is limited to below 480 VDC, so the DC link voltage may vary only between 250 VDC and 480 VDC.

The amount of deviation in DC link voltage from the nominal setpoint may be controlled by sizing the energy storage unit and setting the control parameters, such as PID gains, of the fuel control loop. The voltage deviation from setpoint may be reduced by increasing the capacity of the energy storage unit, which reduces voltage change for a given unit of stored energy. The energy storage unit should be sized such that it has sufficient capacity to respond to transients while allowing the DC link voltage to stay within acceptable voltage ranges for the AC-DC converter output and the power delivery unit input. In the case of an ultra-capacitor energy storage unit, the capacity is directly related to the square of the DC link voltage.

The control system described herein allows the power generating unit to support rapid transients without any measurement of the load itself, any predictions of anticipated load changes, or any feed-forward control logic based on anticipated load changes. However, knowledge of the load characteristics may allow the design of the power generating unit to be more efficient. For example, if a load has a perfectly sinusoidal power draw, the gas turbine engine ideally should always run at a steady state power output equal to the average of the sinusoidal power draw, and the energy storage unit should meet all of the load variations from that average value without allowing the DC link voltage to deviate too far from the nominal set point. This behavior is ideal but it is possible to get close to this behavior in actual implementation by tuning the fuel controller to have a very slow response time, knowing that the load is predictably sinusoidal. In addition, machine learning algorithms may be implemented in the control system to anticipate changes in load profiles or environmental conditions, and the fuel controller parameters, such as PID gains, may be tuned while the machine is in operation to address these anticipated changes.

The example of sinusoidal load also illustrates a sizing methodology can be applied to any generic application. For a particular application, the gas turbine engine and the AC-DC converter may be sized for the average load, the power delivery unit (which delivers power to the load) may be sized for the peak load, and the energy storage unit may be sized such that the DC link voltage deviation does not fall outside the acceptable range of either the AC-DC converter or the power delivery unit.

The embodiment of FIG. 4 does not actively control for power output, that is, power output is not used as a set point in any control loop. The control system passively and immediately meets the power demand of the load, and the fuel control loop slowly regulates parameters that inherently have high inertia, which allows the power generating unit to respond to transients slowly without putting excessive stress on the engine.

The power generating unit and its control system use the energy storage unit as a buffer to isolate the engine from the load. Traditional power generating units, such as a reciprocating engine coupled to an AC generator, are often adversely affected by sudden load changes. A sudden increase in load can put too much torque on the generator and cause the engine to stall. The isolation between the engine and the load means that the load has no immediate effect on the engine, as long as the control system addresses changes within the time frame allowed by the energy storage buffer.

Figure 5C:
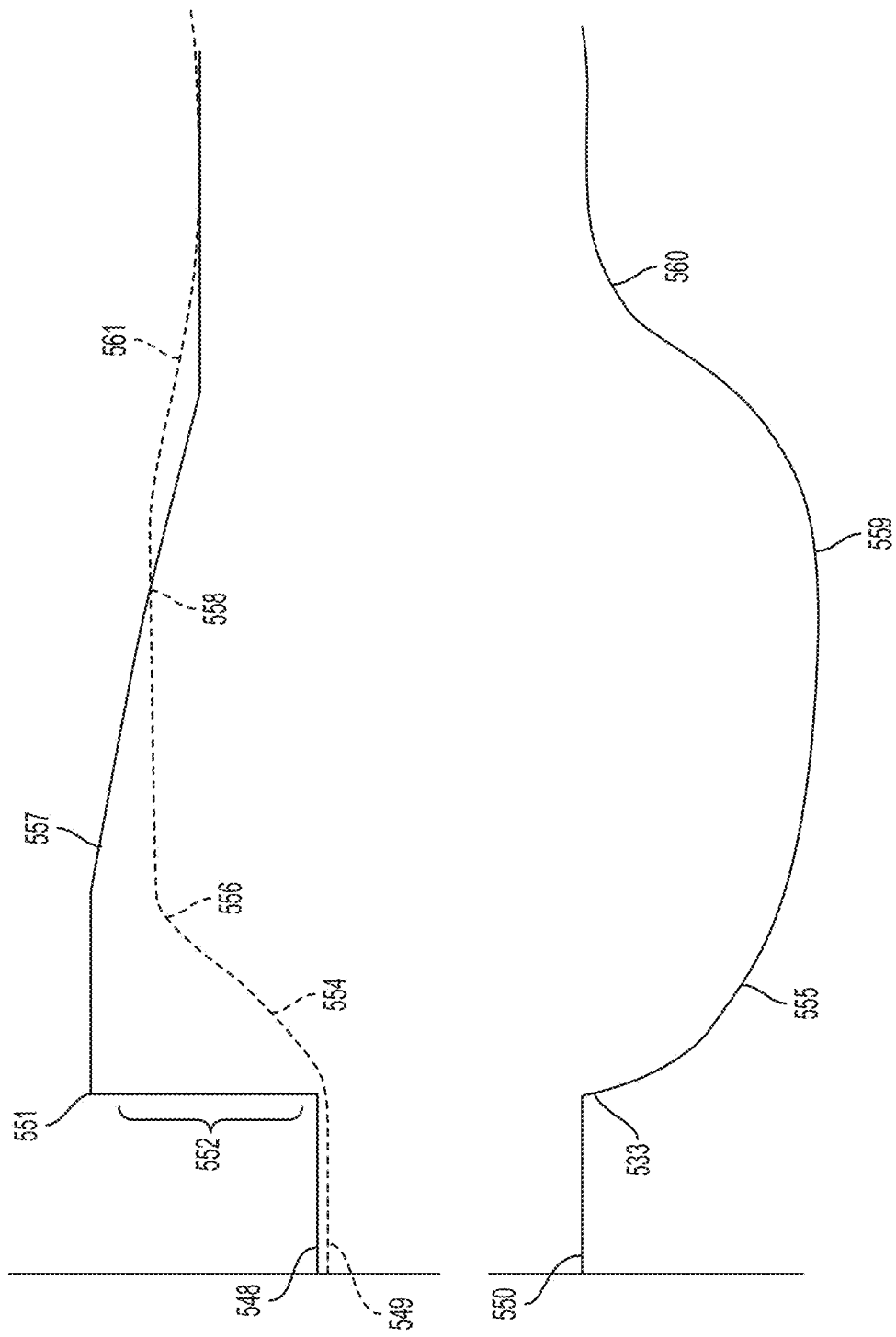

In the case that the power delivery unit is a VFD, the control system may further control the load by controlling the frequency setpoint of the VFD. For example, when the VFD is driving a motor, the motor load may be reduced by reducing the frequency of the AC power output and slowing down the motor. FIG. 5C describes a situation in which the control system controls both the fuel input into the engine and the frequency output of the VFD. FIG. 5C shows transient behavior of the power delivered to the load (548), the power produced by the engine-generator set (549), and the DC link voltage (550). Note that the drawing is not to scale. The power generating unit is at steady state at the left side of FIG. 5C. The load is suddenly increased at 551. The gas turbine engine has not been commanded to spool up to meet the load, but the power delivery unit meets the load immediately by using the energy storage unit to make up for the power deficiency (552). The energy storage unit drains and causes the voltage to drop at the DC link (553). At this point, the fuel controller sees a drop in voltage and commands more fuel into the combustor. This spools up the gas turbine engine and the engine starts producing more power (554). This slows down the drop in DC link voltage (555) because the energy storage unit is being drained less quickly. However, the gas turbine engine power output reaches a maximum threshold (556). At this point, the control system begins reducing the frequency setpoint of the VFD, which causes the load to reduce (557). Eventually the load power draw is below the gas turbine engine maximum power output (558). This allows the energy storage unit to start charging back (559) to nominal DC link voltage. As the energy storage unit recharges, as indicated by the DC link voltage returning to nominal (560), the fuel controller will reduce fuel to the gas turbine engine such that the gas turbine engine power output matches that of the load (561). The PID gains for the VFD control may be different from those for the fuel control. For example, it may be advantageous to reduce the output frequency at one response rate to prevent the power generating unit from stalling, but return the output frequency toward nominal values at a slower rate.

Nested Control Loops for Power Generating Unit

Figure 6:
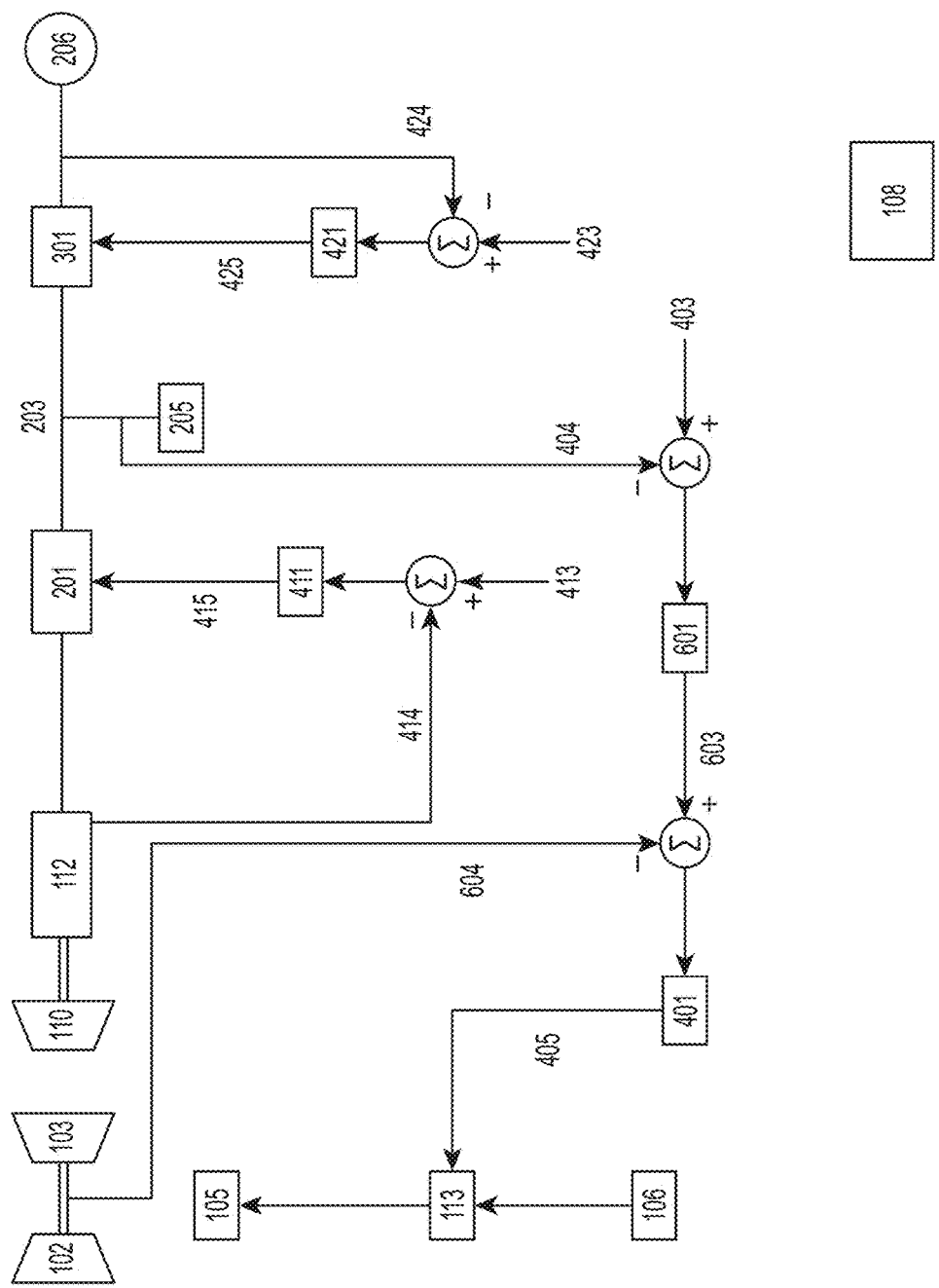

FIG. 6 shows another embodiment of a control system for a power generating unit. In the control system of FIG. 6, the AC-DC converter controller (411) and the power delivery unit controller (421) remain unchanged, but the fuel controller (401) is augmented with an engine speed controller (601). The engine speed controller (601) evaluates the measured DC link voltage (404), and compares it to a DC link voltage set point (403). The engine speed controller (601) may be a PID controller that outputs a first turbine speed set point (603) to maintain DC link voltage near the nominal set point. Similar to the other control method described earlier, the DC link voltage is deliberately allowed to deviate significantly from the nominal set point during load transients. The fuel controller (401) receives this first turbine speed set point (603) from the speed controller (601), and evaluates it against the measured first turbine speed (604). The fuel controller (401) may be a PID controller that outputs a control signal (405) to the fuel system (113). The control signal (405) commands the fuel system (113) to vary the fuel flow into the combustor (105) to maintain the first turbine speed (604) to the desired speed set point (603).

An advantage of this control system with nested control loops is that it allows the control system to react to changes in the load and changes in the environmental conditions separately. An application of this control system is in situations where the fuel source is not well controlled and the fuel composition varies frequently over time. The fuel controller may now be primarily responsible for addressing changes in fuel quality, and it quickly controls the engine speed during fuel changes to minimize mechanical and thermal stress on the rotating parts, and also minimizes effect on power output. The speed controller may now be primarily responsible for addressing changes in load, and it slowly controls the DC link voltage during load changes to minimize the speed at which the gas turbine engine spools up or down to meet the load.

Figure 7A:
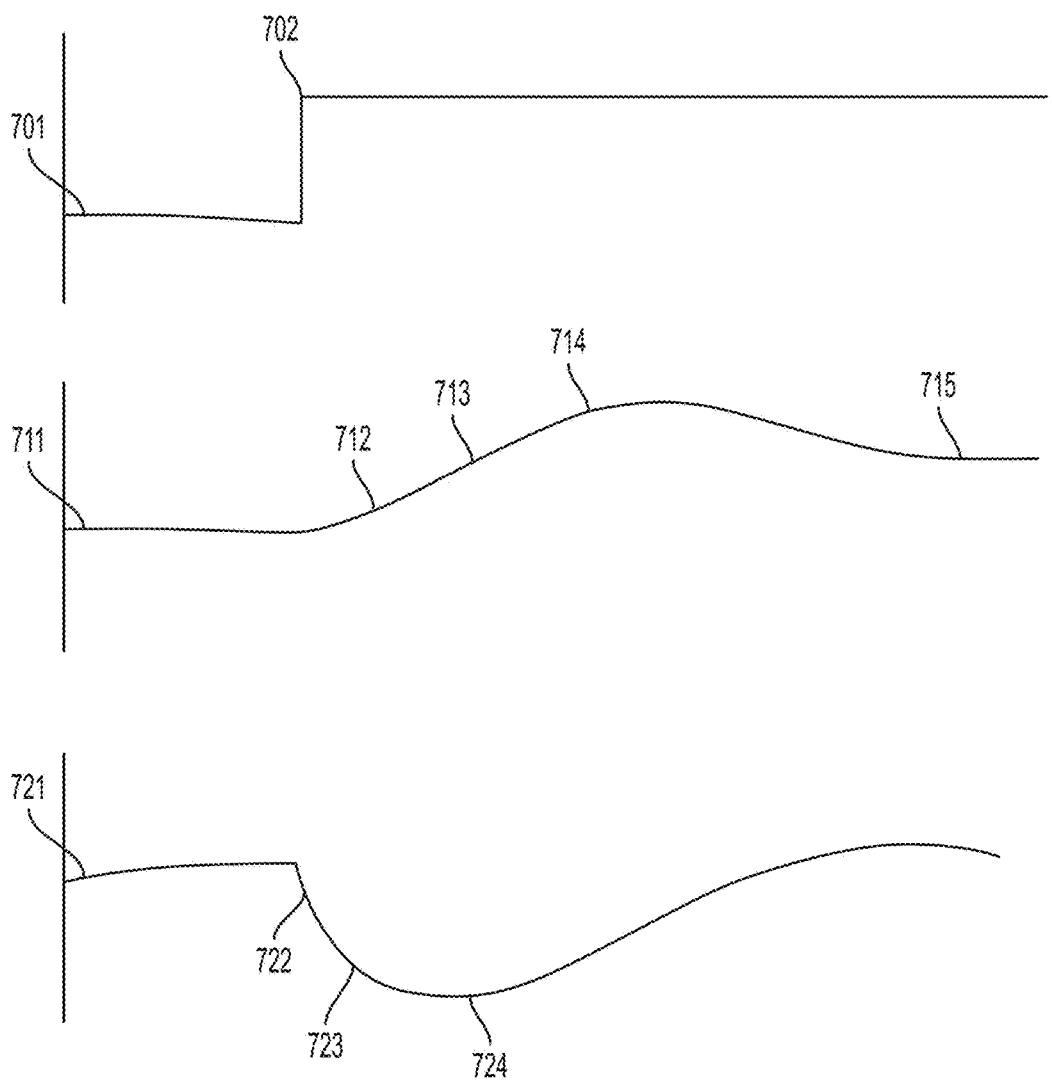
Figure 7B:
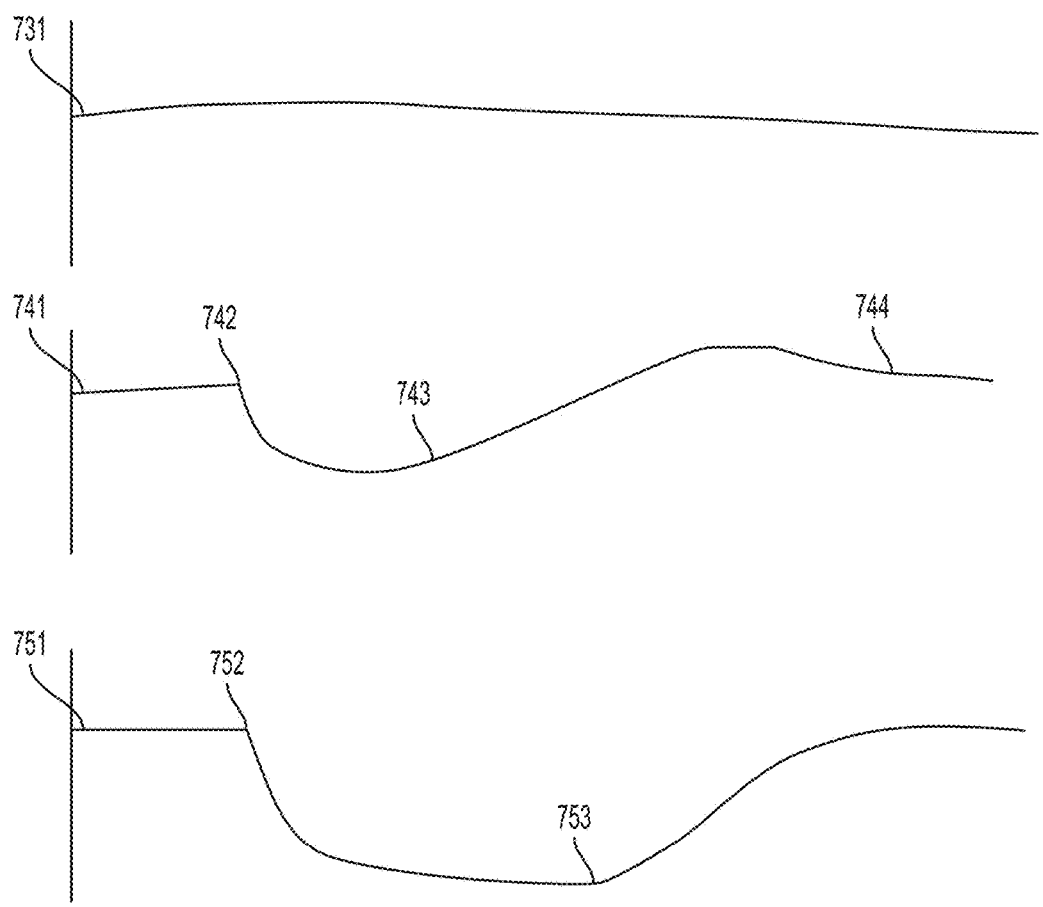

FIGS. 7A and 7B show how the power generating unit's performance parameters vary over time during changes in fuel or load. FIG. 7A shows the load (701), first turbine speed (711), and DC link voltage (721) over time during a sudden load change. The load suddenly increases at 702. The DC link voltage immediately drops (722) because the energy storage unit discharges to meet the load. The speed controller sees a drop in DC link voltage and gradually increases the core turbine speed setpoint. The fuel controller sees a higher speed setpoint and commands a higher fuel flow. This causes the gas turbine engine to spool up (712) and begin producing more power, and as a result the DC link voltage drops more slowly (723). When the gas turbine engine at a sufficiently high speed (713) such that it is producing as much power as the load, the DC link voltage stops dropping (724). The gas turbine engine continues spooling up (714) to produce more power than the load in order to recharge the energy storage unit. Eventually the gas turbine will reach a new equilibrium speed (715) after the energy storage unit is charged back to the nominal value.

FIG. 7b shows the load (731), first turbine speed (741), and DC link voltage (751) over time during a sudden fuel change. The fuel energy density suddenly drops at 742. The first turbine speed drops (742) and the gas turbine produces less power as a result. The DC link voltage also drops (752) because the energy storage unit discharges to compensate for a drop in gas turbine engine power output. At this point, the control system's reactions are the same as the case of a sudden load change. The speed controller sees a drop in DC link voltage and gradually increases the first turbine speed setpoint. The fuel controller sees a higher speed setpoint and commands a higher fuel flow. This results in the gas turbine engine spooling up (743) and the energy storage unit beginning to charge up (753). Eventually the gas turbine will reach an equilibrium speed (744) after the energy storage unit is charged back to the nominal value.

Without the nested control loop design, the power generating unit may respond to load changes as shown in FIG. 7A, and respond to fuel changes as shown in FIG. 7B. With the nested control loop design, the power generating unit may still respond to load changes as shown in FIG. 7A, and fuel changes as shown in FIG. 7B, but the system may return to equilibrium at a faster rate in the case of responding to fuel changes.

This control system with nested control loops separates the effects of fuel change and load change, but it is not necessary to implement this control design to allow the electric power generator to handle fuel quality changes or load changes or both. The simpler control system depicted in FIG. 4 is sufficient for handling both fuel change and load change. However, implementing the design in FIG. 6 allows the control system to distinguish the two effects, whereas the design in FIG. 4 does not distinguish between the two effects. In the control design of FIG. 4, having only one loop allows the system to control for both, but both at the same rate. In the control design of FIG. 6, controlling engine RPM and voltage separately allows the system to control for fuel change much faster. Both types of engine control schemes will allow the engine-generator set to address changing fuel quality and loads. In addition to fuel quality changes, the control systems described herein will also address any other changes in environmental conditions, such as ambient temperature, ambient pressure, and fuel pressure, without requiring any sensors. All of these environmental conditions affect the engine operating point and engine speed, similar to how changing fuel quality affects engine speed. The control system only needs to monitor a parameter that is characteristic of the engine operating point, such as engine speed, to effectively control for a variety of changes in environmental conditions.

Balance of Plant

To start up or shut down the power generating unit, especially for off-grid applications, the power generating unit may include auxiliary power electronics and a backup power source.

Figure 8A:
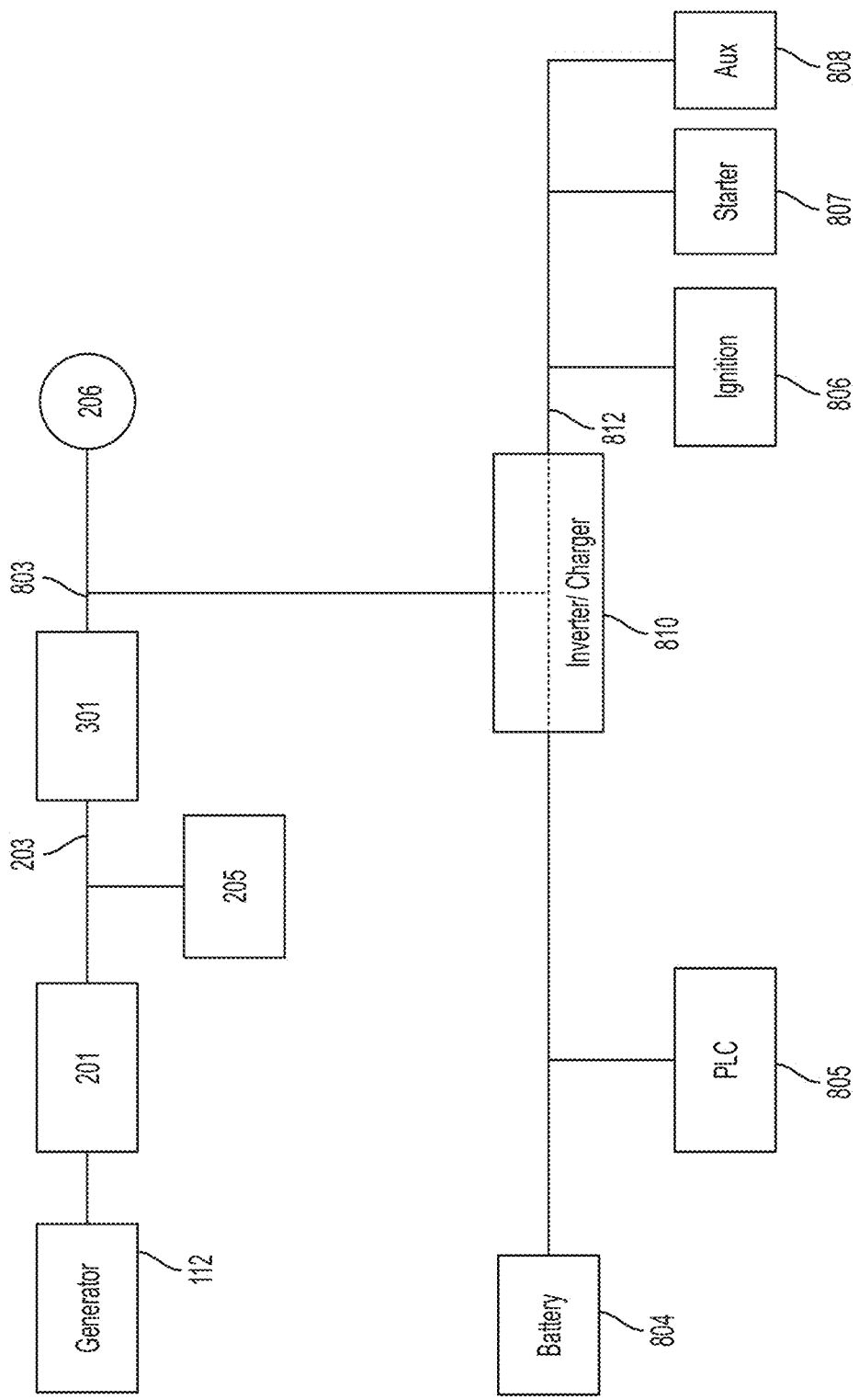

FIG. 8A shows one embodiment of the power electronics system of a power generating unit. In this embodiment, the primary power electronics system includes a generator (112), a first power converter (201), a DC link (203), an energy storage unit (205), a power delivery unit (301), an AC bus (803), and a load (206). In the auxiliary power electronics, the battery bank (804) provides power when the gas turbine generator is not producing power; the programmable logic controller (PLC) (805) provides all control capabilities for the power generating unit; an inverter/charger (810) can convert battery DC power to AC to power auxiliary equipment, or it can convert AC power from the generator to DC power to charge the battery. The auxiliary power electronics support the rest of the power generating unit during startup and shutdown, during which the engine-generator set is not producing power but power is still needed to run auxiliary equipment. Auxiliary equipment may include an ignition system (806), an engine starter (807), and any other auxiliaries (808) such as an oil system and a cooling system. Some auxiliaries (such as ignition, starter) are only run during startup and shutdown, and some auxiliaries (such as oil, cooling) are always running when the engine is running.

During startup, the inverter/charger (810) is in inverting mode and draws power from the battery (804) and generates AC power on an auxiliary AC bus (812). The power on this bus supports the ignition (806), starter (807), and other auxiliary systems (808) needed to start the engine. When the generator (112) starts producing power on the primary AC bus (803), the inverter/charger is in charging mode and uses some power from the AC bus (803) to charge the battery (804) and to power the auxiliary AC bus (812) directly.

Figure 8B:
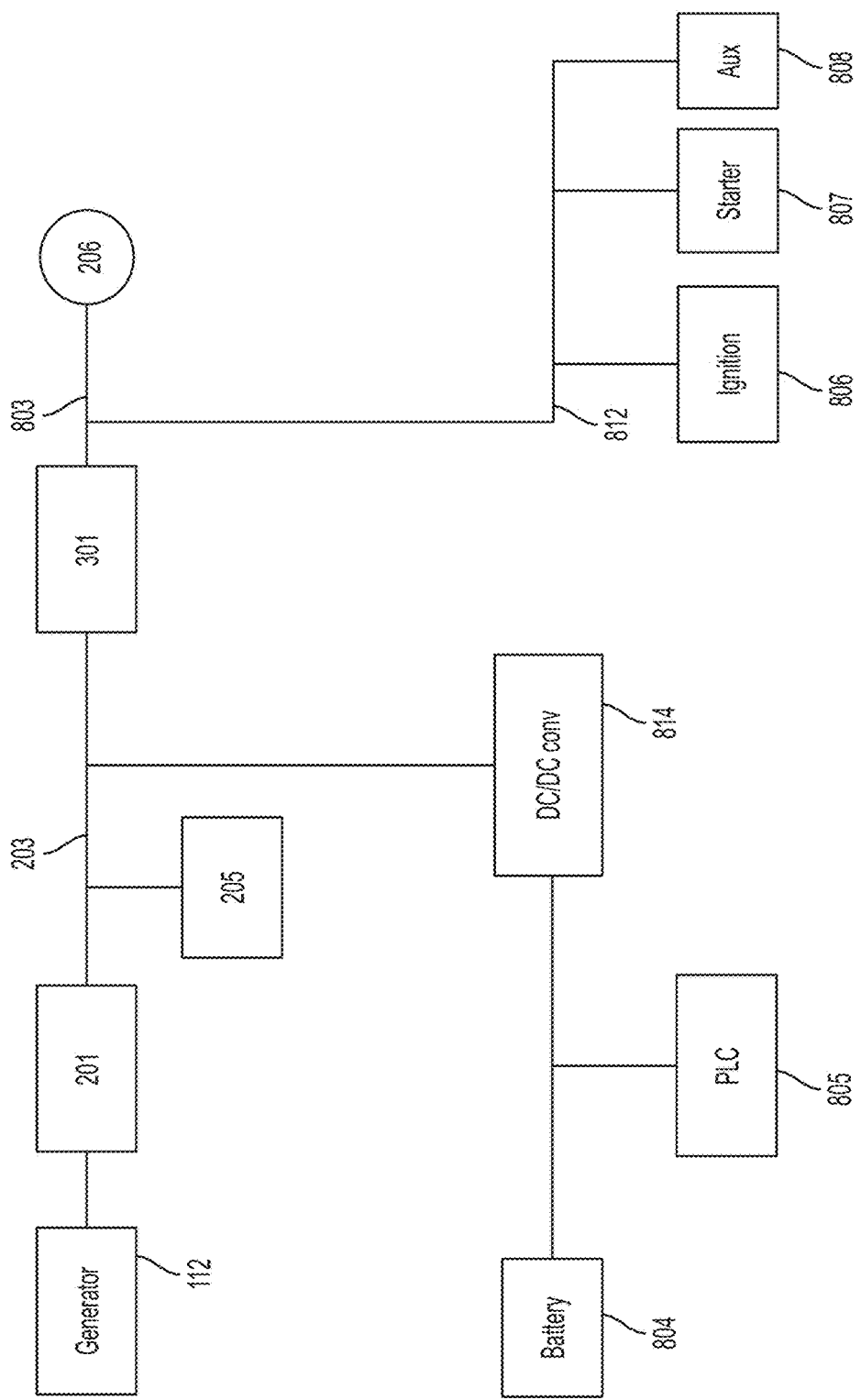

FIG. 8B shows another embodiment of the power electronics system of a power generating unit. The inverter/charger of FIG. 8A may be substituted with a bi-directional buck-boost DC-DC converter (814) that converts between low voltage battery to high voltage DC link. The bi-directional DC-DC converter (814) is connected to the DC link (203) on one end, and connected to the battery (804) on the other end. The power delivery unit (301) supplies power to the AC link (803). The AC link directly supplies the auxiliary AC bus (812), which then supplies the auxiliary equipment such as ignition (806), starter (807), and other auxiliary systems (808). During black start, the bi-directional DC-DC converter operates in boost mode, receives power from the battery (804), and produces high voltage power at the DC link (203). The power delivery unit (301) receives this power from the DC link (203), produces AC power at the AC link (803) and makes power available at the auxiliary AC bus (812). The power at the auxiliary AC bus (812) is then used to power the various auxiliary systems required for starting the gas turbine engine. When the gas turbine engine begins generating power, the bi-directional DC-DC converter (814) switches to buck mode, receives power from the DC link (203), and outputs power to charge the battery (804).

Figure 9A:
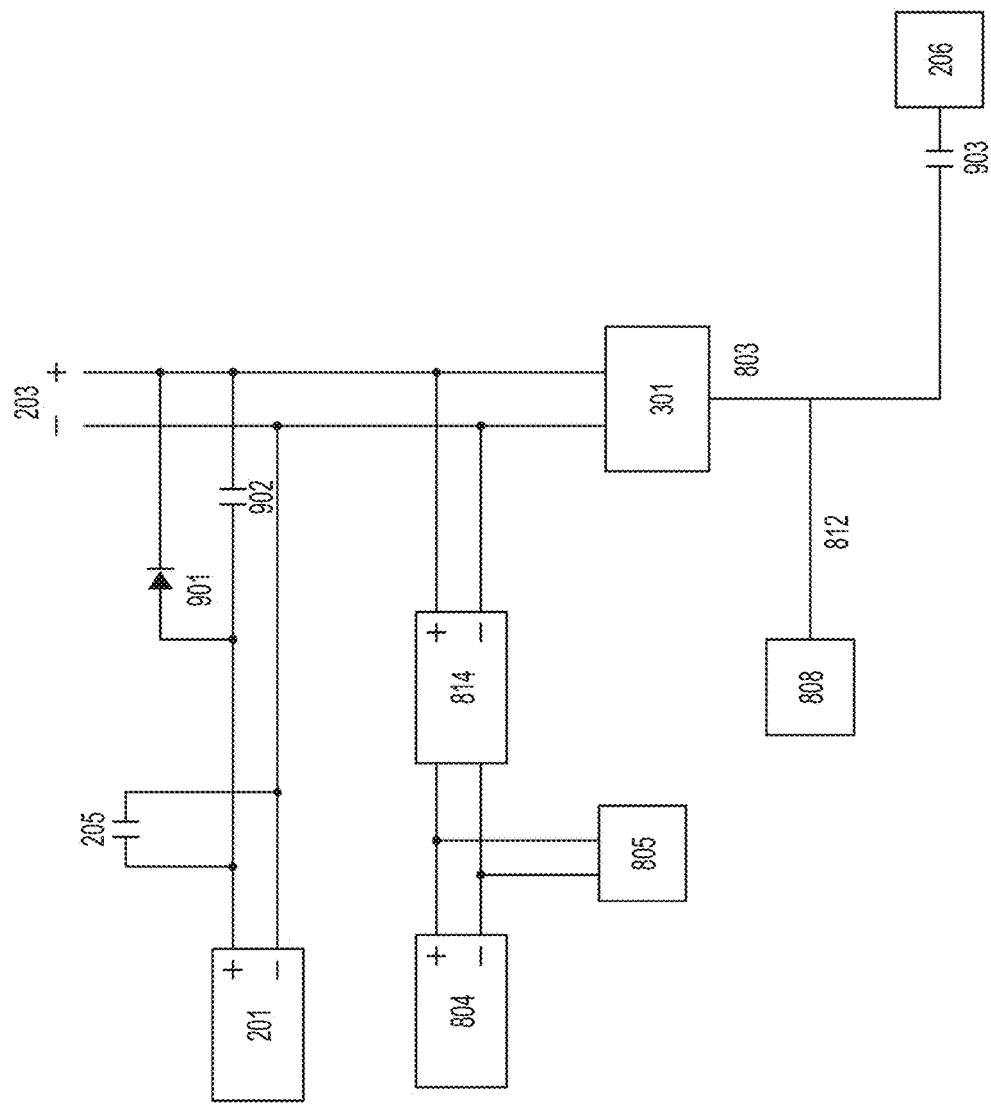

FIG. 9A describes how to implement the power electronics system of FIG. 8B. The system of FIG. 9A also provides a technique for handling the switch between two modes of operation for the power generating unit: a first mode in which the power generating unit needs to black start from battery power, and a second mode in which the power generating unit is producing power and charging the battery. In FIG. 9A, the first power converter (201) provides power to a DC link (203). The ultra-capacitor bank (205) is connected in parallel to the DC link (203) via two paths. In one path, the connection goes through a diode (901). In another path, the connection may be interrupted with a contactor (902). The battery bank (804) is connected to the input of the DC-DC converter (814) and to the PLC (805). The DC-DC converter (814) output is connected to the DC link (203). The DC link (203) is connected to the input of the power delivery unit (301), and the power delivery unit output is connected to the AC bus (803). The AC bus (803) is connected to the auxiliary AC bus (812), which supplies power to auxiliary systems (808). The AC bus (803) is also connected to the load (206). This connection may be interrupted with a contactor (903).

One technique for transitioning from black start to battery charging is described in the phases below.

Figure 9B:
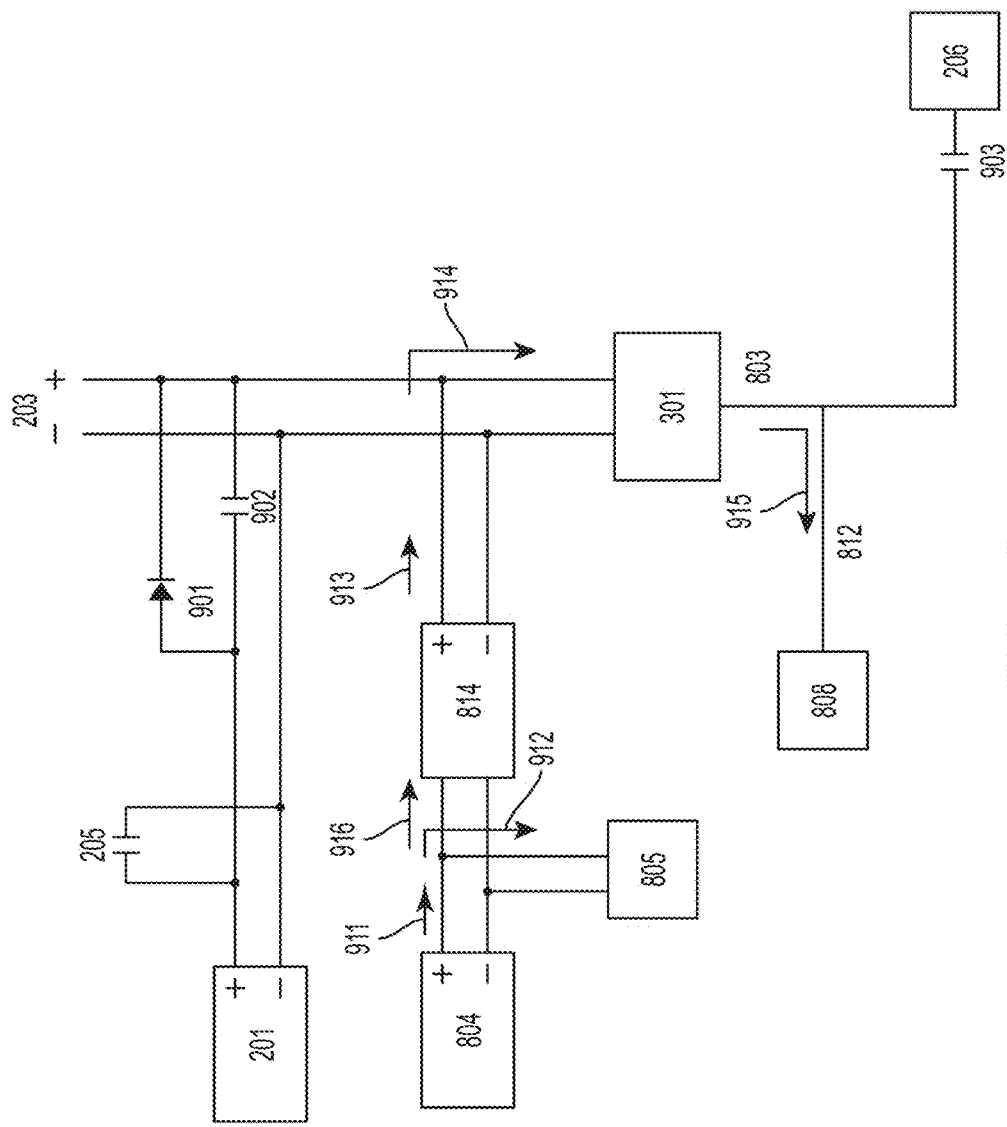

Phase 1: FIG. 9B describes the flow of power within the power electronics systems in Phase 1. When beginning black start operation, first turn on battery (911). The battery supplies power to both the control system (912) and the DC-DC converter (916). The DC-DC converter output is connected to the DC link. The contactor (902) between the DC link (203) and the ultra-capacitor (205) is open. Enable the DC-DC converter in boost mode, and control the voltage to a nominal voltage setpoint. The voltage setpoint may be any value that is acceptable as input voltage to the power delivery unit (301). For example, if the power delivery unit accepts 250-500 VDC input voltage, then the nominal voltage may be set to 400 VDC. This allows the DC-DC converter to output power (913) to the DC link (203). The presence of the diode (901) prevents the DC-DC converter from supplying power to the ultra-capacitor. This is advantageous because the ultra-capacitor stores a large amount of energy and it is not necessary to charge up the ultra-capacitor bank during black start. Then turn on the power delivery unit (301), which draws power (914) from the DC link to supply AC power to the AC link (803). At this point the gas turbine engine can be started. Supply power (915) to auxiliary loads (starter, oil pump, coolant pump, ignition).

Figure 9C:
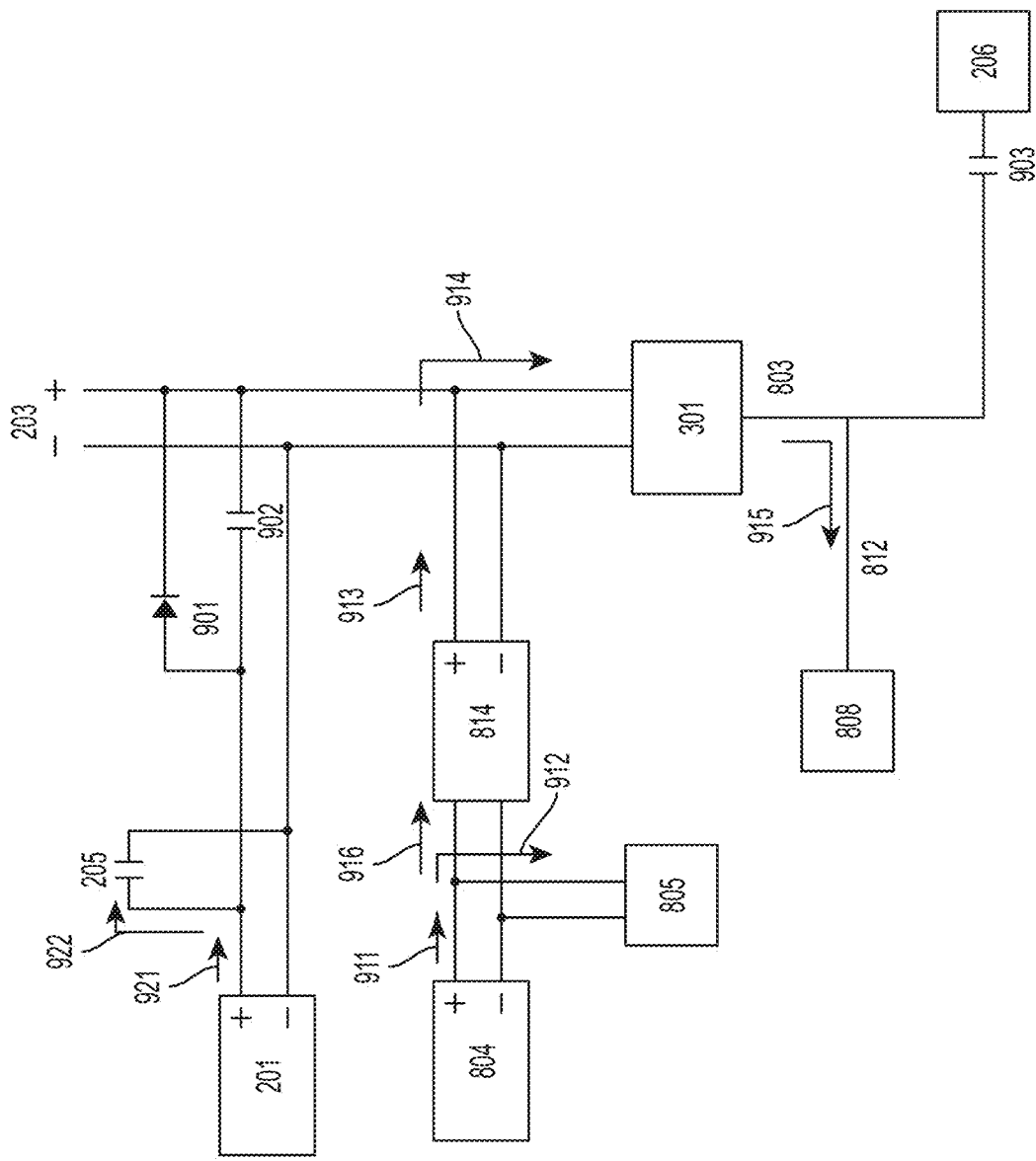

Phase 2: FIG. 9C describes the flow of power within the power electronics system in Phase 2. After starting the auxiliary systems, ramp up fuel flow until the gas turbine engine is at idle but not producing any power. Then increase fuel to begin producing power at the gas turbine. At this point, the first power converter (201) will begin exporting power (921), which will begin charging (922) the ultra-capacitor (205) at a controlled rate. The diode (901) continues to prevent power flow from the ultra-capacitor (205) to the DC link (203) and vice-versa because at this point the ultra-capacitor voltage is lower than the DC link voltage.

Figure 9D:
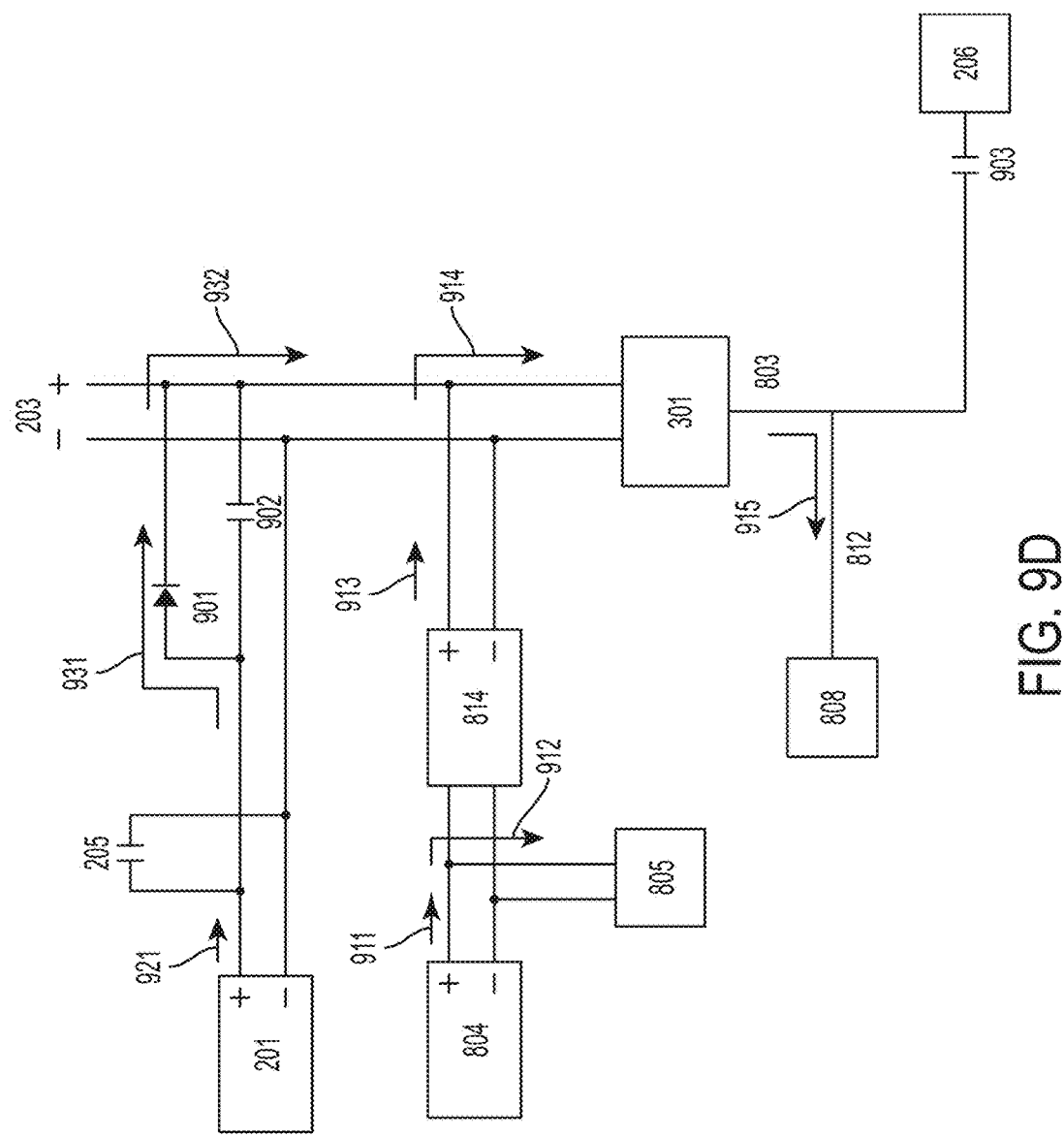

Phase 3: FIG. 9D describes the flow of power within the power electronics system in Phase 3. When the ultra-capacitor (205) charges up to a point such that the ultra-capacitor voltage reaches the DC link voltage, power will begin flowing (931) through the diode (901), which allows the ultra-capacitor to provide power (932) to DC link (205) equal to the power being produced by the gas turbine engine at this time. The diode (901) allows the transition to occur automatically and regulate the DC link at the nominal voltage setpoint specified to the DC-DC converter.

Figure 9E:
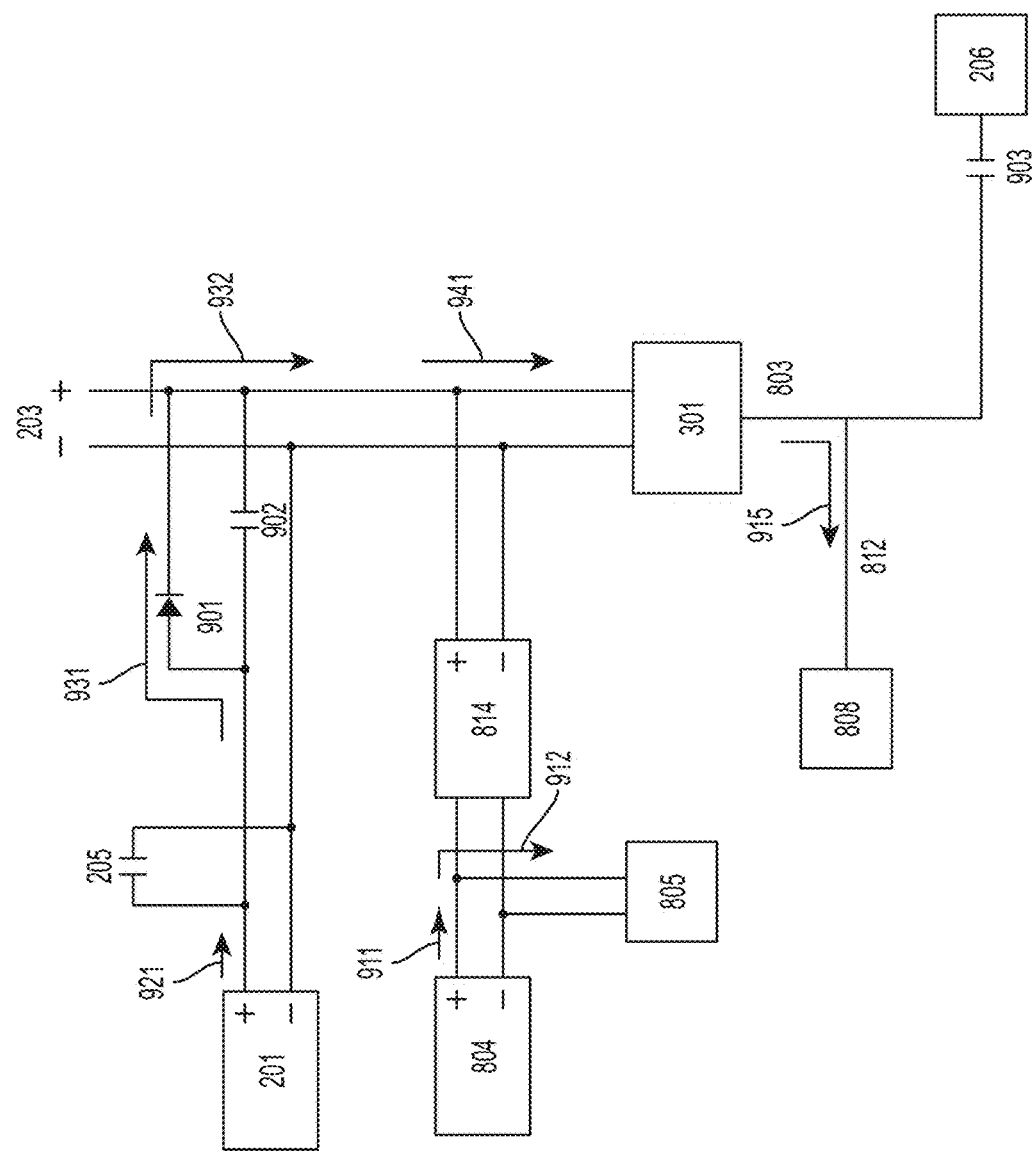

Phase 4: FIG. 9E describes the flow of power within the power electronics system in Phase 4. Increase the fuel flow such that the gas turbine engine produces enough power to run all auxiliary loads. Then disable the DC-DC converter (814). The battery (804) continues to provide power (912) to the control system (805). The auxiliary system (808) is powered entirely by the generator, which is providing power to the DC link (932), which then provides power (941) to the power delivery unit (301).

Figure 9F:
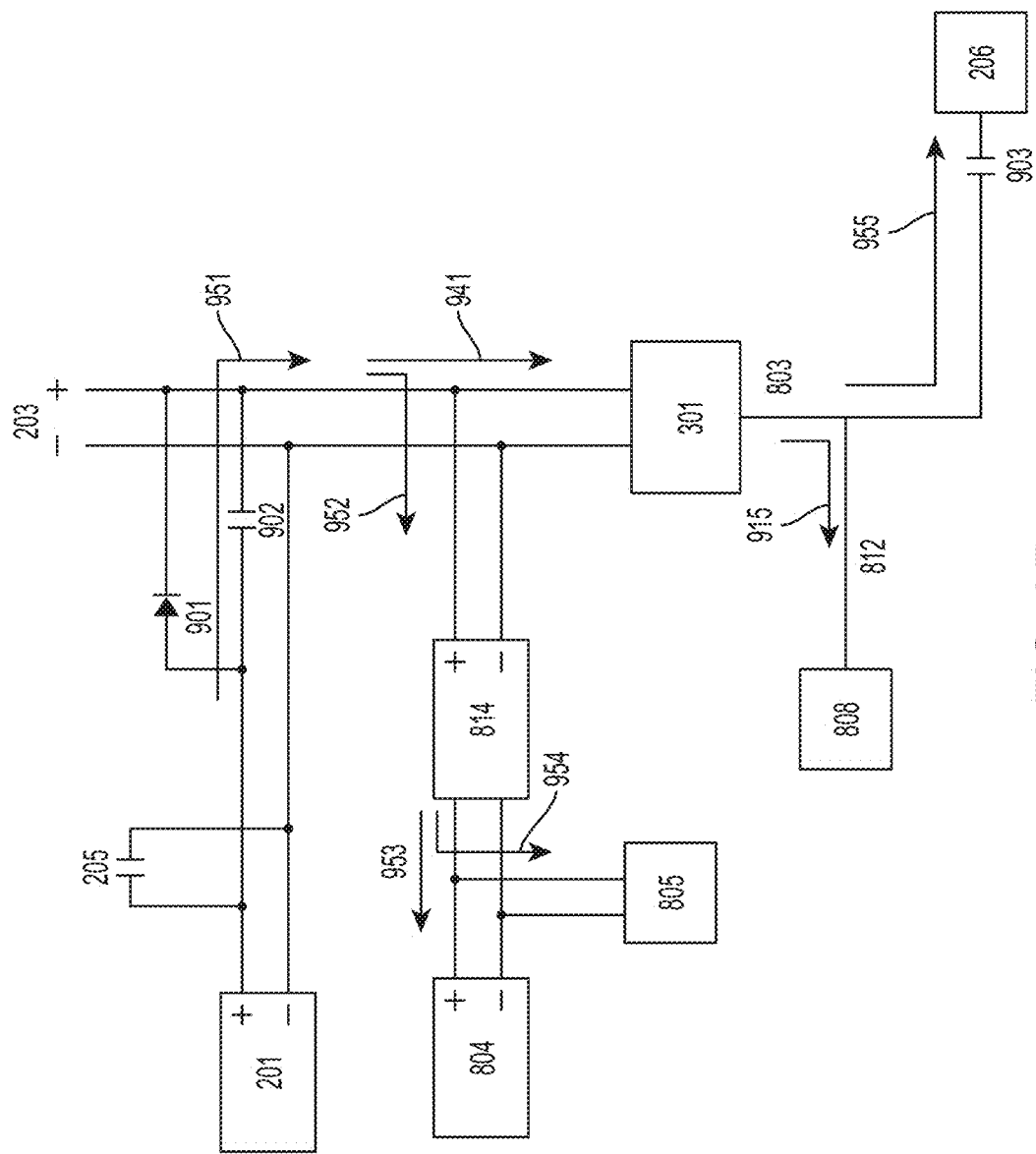

Phase 5: FIG. 9F describes the flow of power within the power electronics system in Phase 5. At this point, the DC-DC converter (814) may be enabled in buck mode. The DC-DC converter (814) now receives power (952) from the DC link (203), charges (953) the battery, and powers (954) the control system. The diode may be bypassed by closing the contactor (902) to avoid power loss that would otherwise occur across the diode. At this point, the load (206) may be connected by closing the load contactor (903). This allows the AC bus (803) to provide power (955) to the load.

The technique described herein for transitioning from black start to battery charging is not limited to using the combination of diode and contactors described in FIG. 9A. Various combinations of diodes, contactors, and other passive or active components may be used to achieve similar effects as described in the phases above.

Generalized Power Generating Unit

Figure 10:
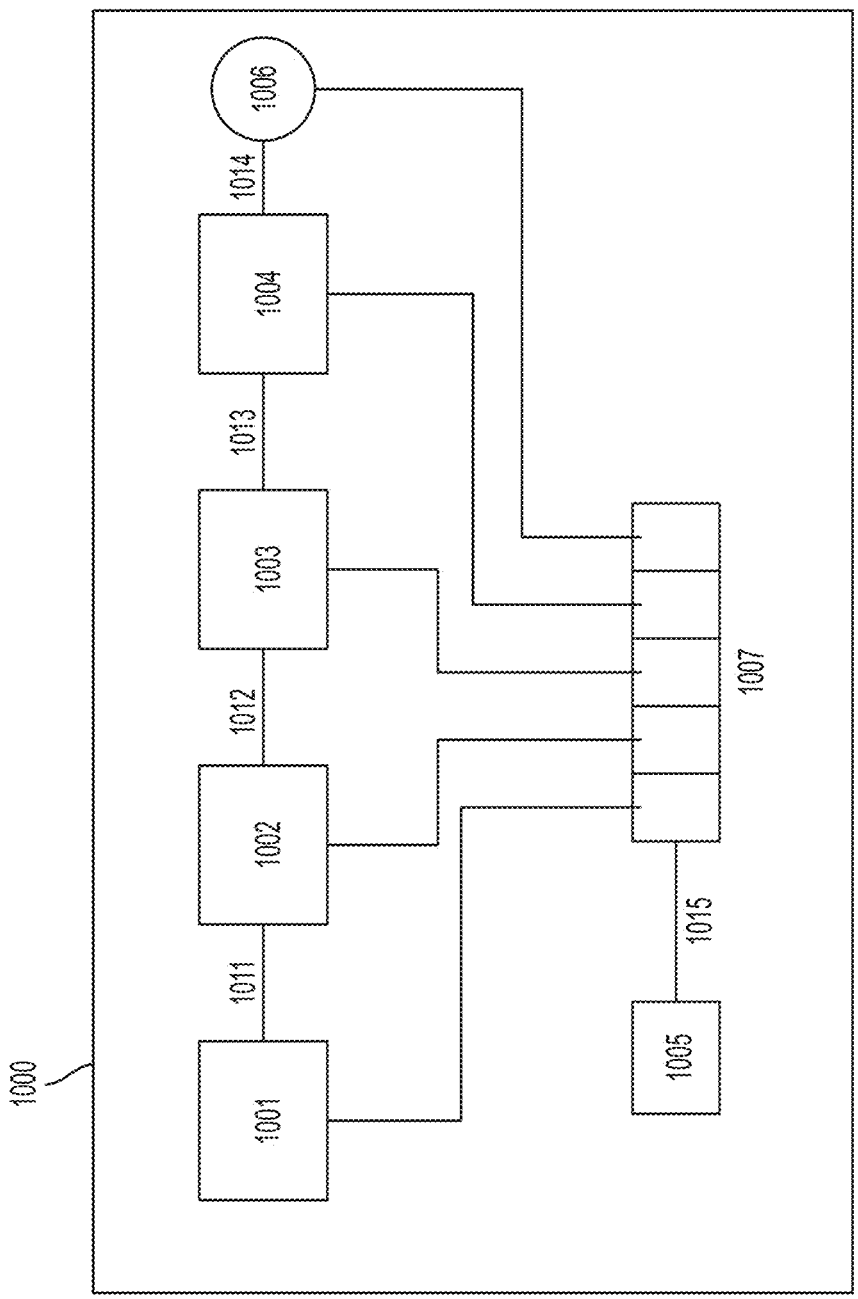

The above embodiments of a power generating unit and control system may be further generalized. FIG. 10 describes a power generating unit (1000) that uses an energy storage unit as a buffer to separate the power delivery from power production. The power generating unit includes a power production unit (1001), a first power converter (1002) that receives a first form of power (1011) from the power production unit (1001) and converts it to a second form of power (1012) that is received by an energy storage unit (1003), a power delivery unit (1004) that receives the second form of power (1013) from the energy storage unit (1003) and converts it to a third form of power (1014) that is delivered to the load (1006). The power generating unit has one or more sensors (1007) that measures one or more parameters of the power generating unit that is related to the mismatch between the amount of power produced by the power production unit (1011) and the amount of power delivered by the power delivery unit (1014) to the load (1006). The power generating unit has a control system (1005) that evaluates the measurements (1015) from the one or more sensors (1007) and controls the power production unit (1001) to regulate one or more measurements from the one or more sensors (1007).

Figure 11:
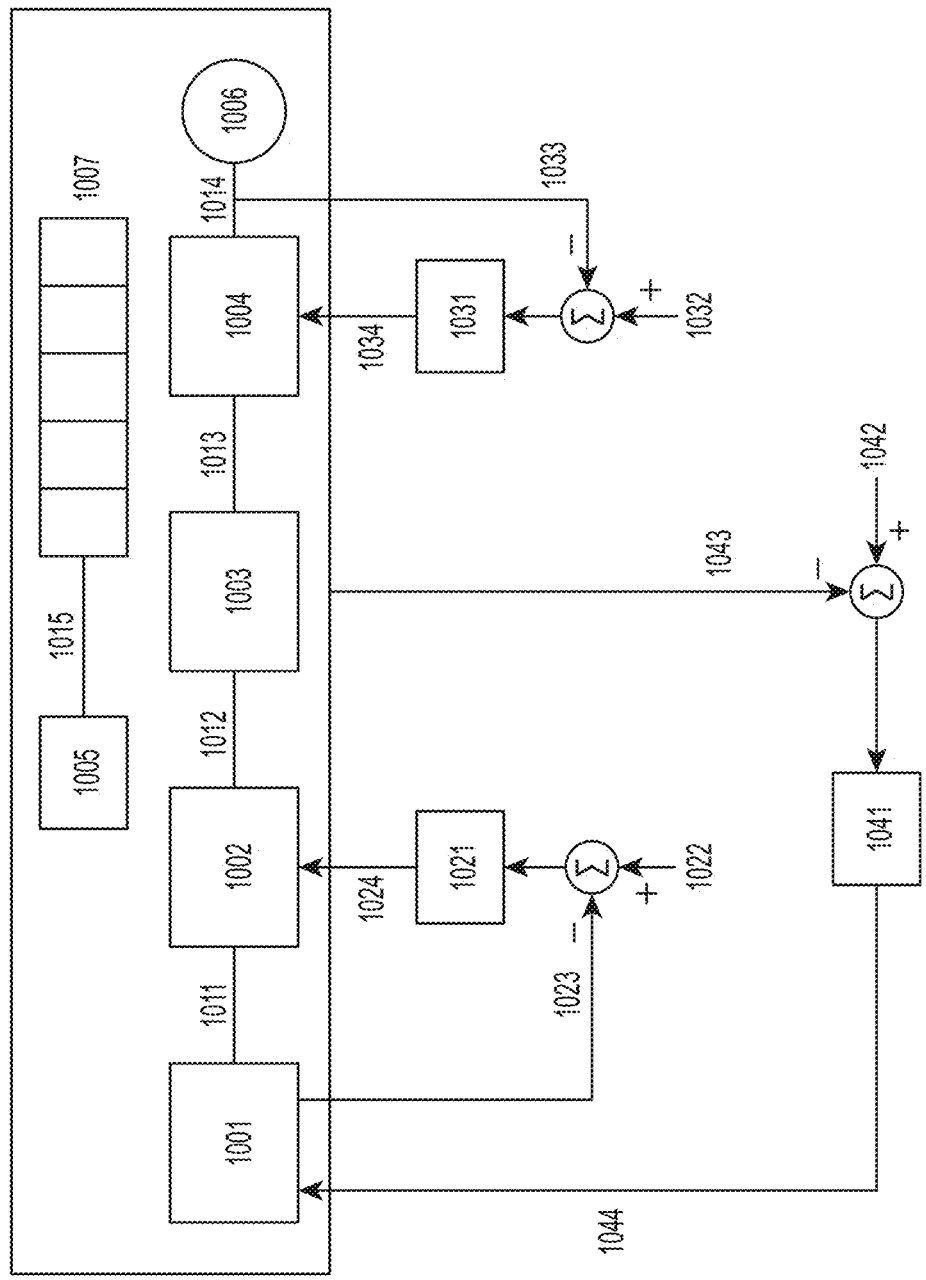

FIG. 11 describes the control system (1005) that controls the power generating unit of FIG. 10 in more detail. The control system includes three control loops. A first control loop (1021) sends a control signal (1024) to the first power converter (1002) to control the amount of power output from the first power converter (1012) to the energy storage unit (1003) in order to regulate the feedback signal (1023) of one parameter of the power production unit (1001). A set point (1022) of the parameter of the power production unit is communicated to the first power converter control loop (1021). This set point may stay constant or may be variable when the power generating unit is operating. The first power converter control loop (1021) measures the parameter (1023), and delivers power (1012) to the energy storage unit (1003) in order to maintain the parameter (1023) at the desired set point (1022). High speed power electronics in the first power converter may regulate the parameter very effectively, such that deviations between the parameter and the set point may be lower than 1%.

A second control loop (1031) controls the amount of power output from the power delivery unit (1004) to the load (1006), and regulates the characteristics of the output power (1014), typically voltage. The power delivery unit (1004) receives power from the energy storage unit (1003) and a pre-determined output voltage set point (1032). The second control loop (1031) measures the output voltage (1033), and controls power output (1014) to the load (1006) such that the output voltage (1033) is maintained at the desired voltage set point (1032). In the case that the power delivery unit (1004) produces AC power, the frequency of the output is also controlled. Typically frequency is controlled to a fixed value of either 50 Hz or 60 Hz. In the case that the power delivery unit (1004) is a VFD, the frequency of the output is controlled to the desired value, which may vary over time depending on the particular application. In all cases, voltage and frequency set points are typically determined by the load in the application.

A third control loop (1041) controls an input (1044) to the power production unit (1001) to regulate a measured parameter (1043) of the power generating unit (1000) that indicates mismatch between power production and power delivery. The measured parameter (1043) is regulated to a setpoint (1042) that is provided to the third control loop (1041). The input (1044) has the characteristic that changing its value will change the power output (1011) from the power production unit (1001). For example, the third control loop may control fuel flow into the power production unit to regulate the measured voltage across the energy storage unit to a pre-determined setpoint.

Figure 12:
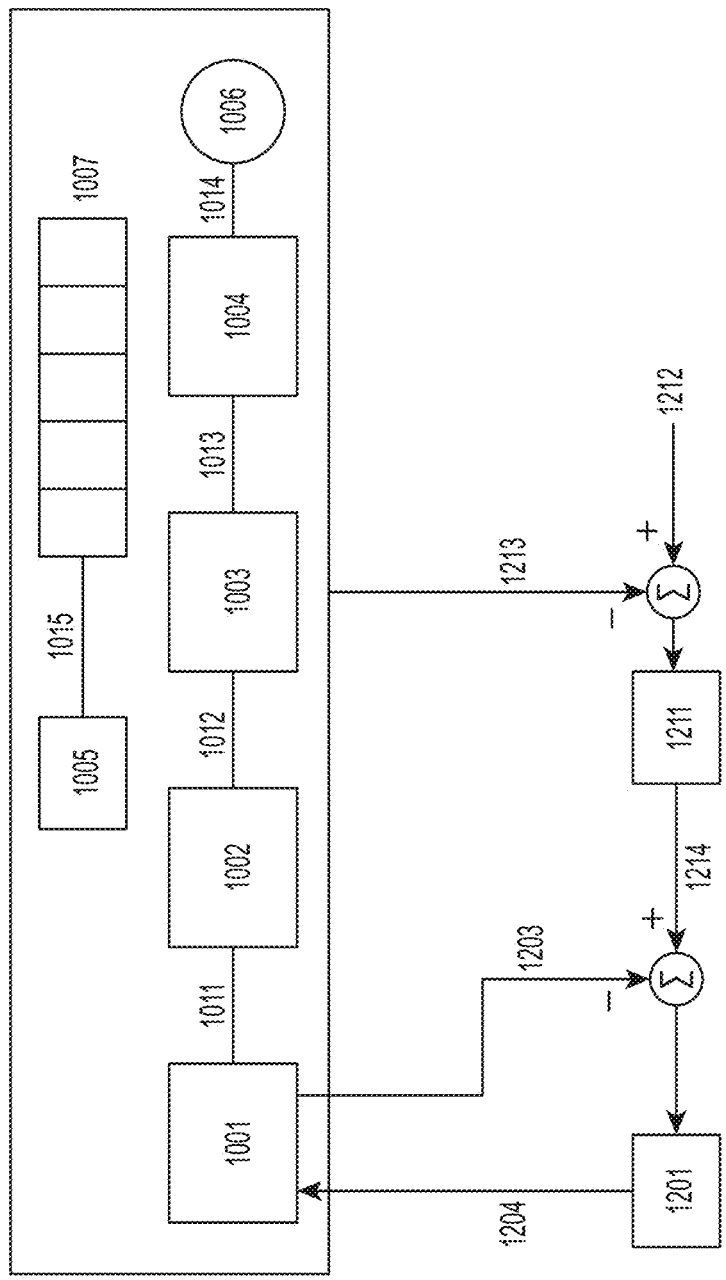
FIG. 12 another control system for the generalized power generating unit of FIG. 10

FIG. 12 describes another control system in which the first and second control loops are the same as those described in FIG. 11 (not shown in FIG. 12), but the power production unit (1001) is controlled by two nested control loops. An outer control loop (1211) controls the setpoint (1214) of one parameter (1203) of the power production unit (1001) in order to regulate a measured parameter (1213) of the power generating unit (1000) that indicates mismatch between power production (1011) and power delivery (1014). The outer control loop (1211) regulates this mismatch parameter (1213) to a setpoint (1212). An inner control loop (1201) receives the setpoint (1214) from the outer control loop (1211) for the parameter (1203) of the power production unit (1001), and the inner control loop (1201) controls an input (1204) to the power production unit (1001) to regulate this parameter (1203). The parameter (1213) being regulated by the outer control loop (1211) may be allowed to vary more slowly and deviate more from the desired setpoint (1212), and the parameter (1203) being regulated by the inner control loop (1201) may be allowed to vary more quickly and deviate less from the desired setpoint (1214).

In one embodiment of a power generating unit, the power production unit (1001) is an engine-generator set comprising a two-shaft gas turbine engine and a high speed permanent magnet electric generator, the first power converter (1002) is an AC-DC converter, the energy storage unit (1003) is an ultra-capacitor bank, and the power delivery unit (1004) is a DC-AC converter. The parallel connection between the AC-DC converter, energy storage unit, and the DC-AC converter form a DC link. The sensor (1007) measures voltage across the ultra-capacitor bank, which is also the DC link voltage. The DC link voltage is related to the mismatch between power production and power delivery. When power delivery exceeds power production, the voltage across the ultra-capacitor bank will drop; when power production exceeds power delivery, the voltage across the ultra-capacitor bank will rise. The control system (1005) controls fuel flow into the gas turbine engine based on the measured voltage across the DC link. The first control loop (1021) controls power output to the ultra-capacitor bank to regulate generator speed. The second control loop (1031) controls power output to the load while maintaining the desired voltage and frequency. The third control loop (1041) controls fuel flow input to the engine-generator set to regulate the DC link voltage. When the DC link voltage is lower than nominal, the engine-generator set is not producing enough power for the load, so fuel input to the engine-generator set is increased to increase power production. When the DC link voltage is high than nominal, the engine-generator set is producing too much power for the load, so fuel input to the engine-generator set is reduced to reduce power production.

In another embodiment, the power delivery unit (1004) may be a variable frequency drive instead of a fixed frequency DC-AC converter. The second control loop, now for the variable frequency drive, controls power output to the load while maintaining the desired voltage and frequency, where the frequency is now variable. All other components of the power generating unit and all other control loops of the control system may be configured to act in the same way.

In another embodiment, the power production unit (1004) may be an engine-generator set comprising a reciprocating engine and an AC induction generator. The third control loop, now for the reciprocating engine, now controls fuel flow into the reciprocating engine to regulate the DC link voltage. All other components of the power generating unit and all other control loops of the control system may be configured to act in the same way.

In another embodiment, the power production unit (1004) may be an engine-generator set comprising a single shaft gas turbine engine and a high speed permanent magnet generator. The first control loop may control power output from the engine-generator set to the energy storage unit by regulating turbine inlet temperature. The third control loop may still control fuel flow into the engine-generator set to regulate DC link voltage. All other components of the power generating unit and all other control loops of the control system are configured and act in the same way.

In one embodiment of a power generating unit and a control system that includes controller with nested control loops for the power production unit, the power production unit (1001) is an engine-generator set comprising a two-shaft gas turbine engine and a high speed permanent magnet electric generator, the first power converter (1002) is an AC-DC converter, the energy storage unit (1003) is an ultra-capacitor bank, and the power delivery unit (1004) is a DC-AC converter. The parallel connection between the AC-DC converter, energy storage unit, and the DC-AC converter form a DC link. The sensor (1007) measures voltage across the ultra-capacitor bank, which is also the DC link voltage. The DC link voltage is related to the mismatch between power production and power delivery. When power delivery exceeds power production, the voltage across the ultra-capacitor bank will drop; when power production exceeds power delivery, the voltage across the ultra-capacitor bank will rise. The control system (1005) controls fuel flow into the gas turbine engine based on the measured voltage across the DC link. The first control loop (1021) controls power output to the ultra-capacitor bank to regulate generator speed. The second control loop (1031) controls power output to the load while maintaining the desired voltage and frequency. The controller for the engine-generator set includes two nested control loops. The outer control loop (1211) controls the speed of the first turbine shaft to regulate DC link voltage. The inner control loop (1201) controls the fuel flow into the engine-generator set to regulate the speed of the first turbine shaft.

Other Embodiments of a Power Generating Unit

The techniques described herein for a power generating unit and control system may not be limited to using a gas turbine engine as the engine. Any type of engine-generator set may be used in the power electronics system disclosed herein. For engine-generator sets that produce AC power, the AC power is first converted to DC, and the DC power is then fed to the DC link in parallel with the energy storage unit. Examples of engine-generator sets that produce AC power include reciprocating engines connected to an AC electric generator. The control system with a single-loop genset controller can control DC link voltage to fuel flow, and does not act differently with this different engine versus a gas turbine engine. In the control system with a dual-loop genset controller, the first loop can control DC link voltage to engine speed, and the second loop can control fuel flow to engine speed. The dual-loop control system also does not act differently with this different engine versus a gas turbine engine. For engine-generator sets that produce DC power, the DC power may be first converted to a different DC power, for example either step up or down in voltage, and the converted DC power is then fed to the DC link in parallel with the energy storage unit.

Energy storage unit may be a flywheel. In the case of a flywheel, the parameter that indicates a mismatch between power production and power delivery may be the speed of the flywheel. The control system may control the fuel flow into the engine-generator set to maintain a nominal speed setpoint of the flywheel. Additional power converter may be required between the DC link and the flywheel.

Energy storage unit may be a battery. Battery voltage does not change very much with the state of charge. A battery may be used as the energy storage unit by implementing a sensor that measures the state of charge. The control system may control the fuel flow into the engine-generator set to maintain a nominal state of charge of the battery. Additional power converter may be required between the DC link and the battery.

The techniques described herein for a general power generating unit and control system may be applied to different types of power production units, and power production units are not limited to engine-generator sets. One example of a power production unit that is not an engine-generator set is a fuel cell. The control system described herein may be advantageous for use with a fuel cell because it allows the power production unit to change slowly versus the load. Fuel cells typically change operating point more slowly than a reciprocating engine or a gas turbine engine. One embodiment of a power generating unit includes a fuel cell, a first power converter that converts the fuel cell electrical power output to a second form of electrical power to a DC link, an ultra-capacitor bank that is parallel to the DC link and receives the second form of electrical power, and a DC-AC converter that receives power from the ultra-capacitor bank and converts the power to AC power that can be used by the load. The control system for this power generating unit can control fuel flow, or another parameter that influences total power output of the fuel cell, in order to modulate the DC link voltage.

Another embodiment of a power generating unit includes is a wind turbine generator, a first power converter that converts the wind turbine generator electrical power output to a second form of electrical power to a DC link, an ultra-capacitor bank that is parallel to the DC link and receives the second form of electrical power, and a DC-AC converter that receives power from the ultra-capacitor bank and converts the power to AC power that can be used by the load. The control system for this power generating unit can control wind turbine blade pitch, or another parameter that influences total power output of the wind turbine, in order to modulate the DC link voltage.

Other Applications

The power generator and control system described herein may be implemented in unmanned air vehicles (UAV) to provide power to one or more electric motors for producing thrust or attitude adjustment. For example, a single engine may be used to power 2 or more electric motors on a combined power bus to replace the traditional geared pitch controlled systems. The main value here is decoupling instant power demand from engine RPM which is more complex to achieve in the traditionally mechanical system. Customer benefits include higher performance due to ability to decouple engine and engine RPM from propeller optimization requirements. The resulting advantages are easier weight balancing, independent RPM optimization, use of fuel based prime mover allows for longer flight and loiter times, and more power means higher loading capacity.

Modular Power Generating System

Figure 13:
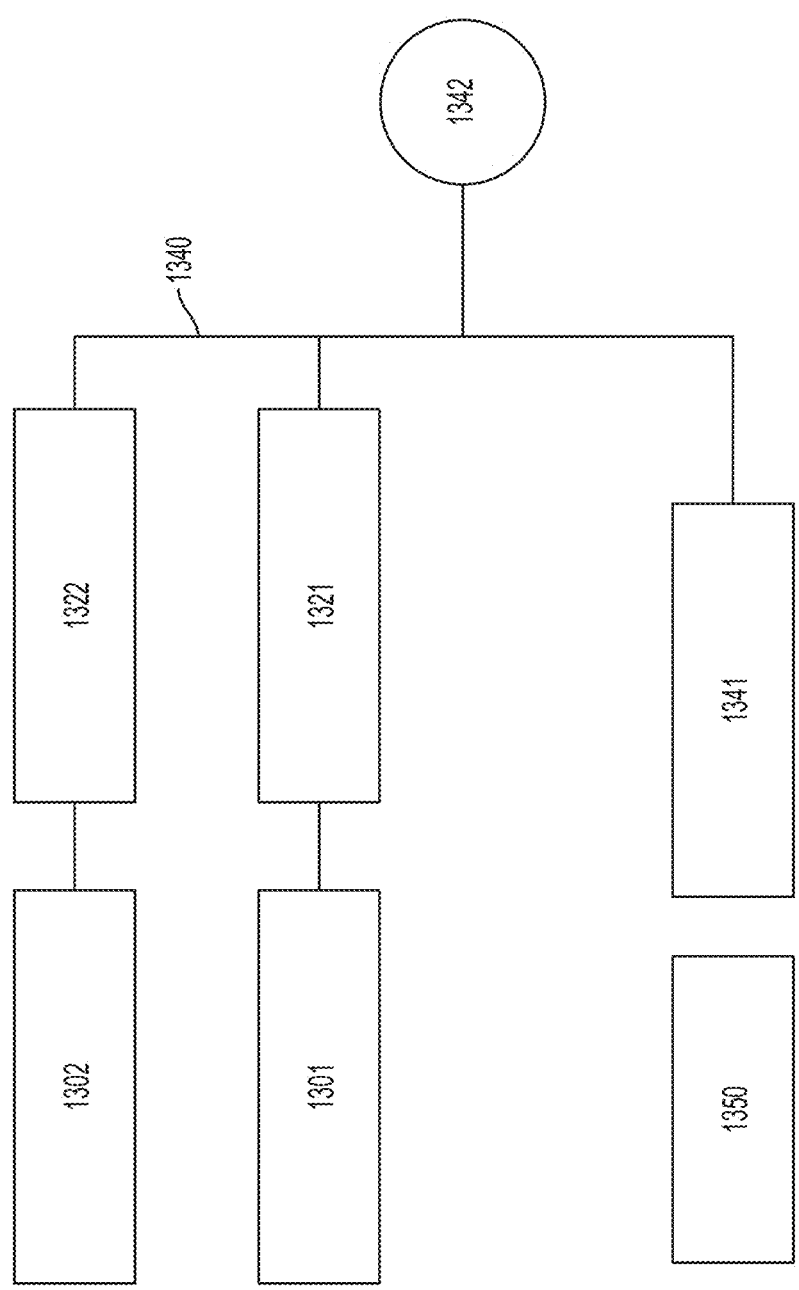
FIG. 13 modular power generating system with a single load

FIG. 13 describes a modular power generating system that includes the following components. There are two engine-generator sets (1301, 1302), each sending power to its own first power converter (1321, 1322), which may be an AC-DC converter if the engine-generator set produces AC power. The first power converters (1321, 1322) are connected together in parallel to a DC link (1340), and each of the first power converters deliver power to the DC link. An energy storage unit (1341) is also in parallel to the DC link (1340). Even though one energy storage unit (1341) is shown, multiple energy storage units may be tied together in parallel to the DC link without changing the behavior of the modular power generating system. One load (1342) takes power directly from the DC link (1340).

The modular power generating system also has a control system (1350) that controls the fuel flow into the engine-generator sets. The control system (1350) works similarly to the control system of the single power generating unit. The control system (1350) may measure the voltage at the DC link (1340) and command fuel flow into one or both of the engine-generator sets to regulate the DC link voltage. One example of controlling the two engine-generator sets is to first ramp up only one of the engine-generator sets, and then ramp up the second one only when the load exceeds the capacity of the first one. Another example of controlling the two engine-generator sets is to ramp up both engine-generator sets at part load, and adjust the fuel flow into either or both engine-generator sets depending on the rate of change in the DC link voltage.

The engine-generator sets are isolated from each other, and the status of one engine-generator set does not affect the performance of the other. Therefore, the modular power generating system may be designed and built in a modular fashion, with some of the advantages described as follows. The modular power generating system does not need additional synchronization hardware between engine-generator sets to achieve stable operation because they are all connected at the DC link. The capacities or power output ratings of the engine-generator sets do not need to be equal to each other; one engine-generator set may be sized for a large baseload, and another engine-generator set may be sized for smaller load fluctuations. The modular power generating system also is not limited to two engine-generator sets; another engine-generator set may be added by connecting it to its own first power converter, and then connecting the first power converter in parallel to the DC link. The control system will then control fuel flow into all engine-generator sets.

Figure 14:
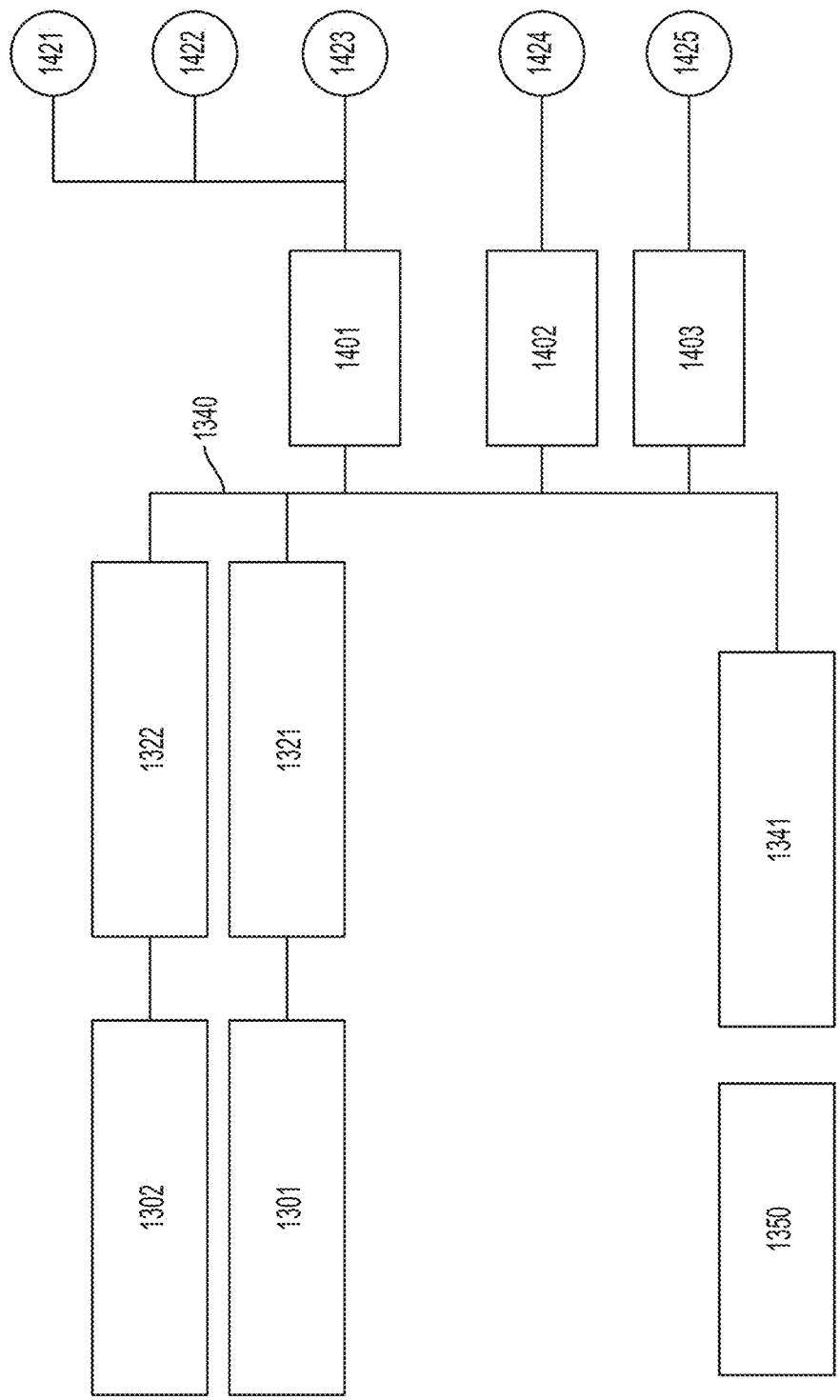
FIG. 14 modular power generating system with multiple power delivery units

FIG. 14 shows a modular power generating system including two engine-generator sets, each with its own first power converter, which may be an AC-DC converter if the engine-generator set produces AC power. Both first power converters are connected in parallel to an energy storage unit at a common DC link. In this embodiment, the DC link (1340) provides power to multiple power delivery units (1401, 1402, 1403), each of which may be a DC-AC converter, a DC-DC converter, or other component that delivers power to the load. The first power delivery unit (1401) provides power to three loads (1421, 1422, 1423). The second power delivery unit (1402) provides power to one load (1424). The third power delivery unit (1402) provides power to one load (1425). In general, each power delivery unit forms its own microgrid and can provide power to one or more loads.

The modular power generating system with the common DC link, energy storage unit, and associated controls described herein isolates the power production side (engine-generator sets and AC-DC converters) from the load side (power delivery units). As a result, the number of generators does not need to equal the number of power delivery units, as shown by example in FIG. 14.

The techniques described herein allow greater modularity when building a power generating system containing multiple engine-generator sets. An example application for this type of system is powering multiple pumps at a multi-well pad in the oil field. For example, one pad may have three pumps. Each pump has its own pump motor, which draws a certain amount of power. In the case of pump jacks, the load will not be constant. It is common in industry to stagger the timing of the pump jacks such that they do not all draw max power at the same time.

Figure 15:
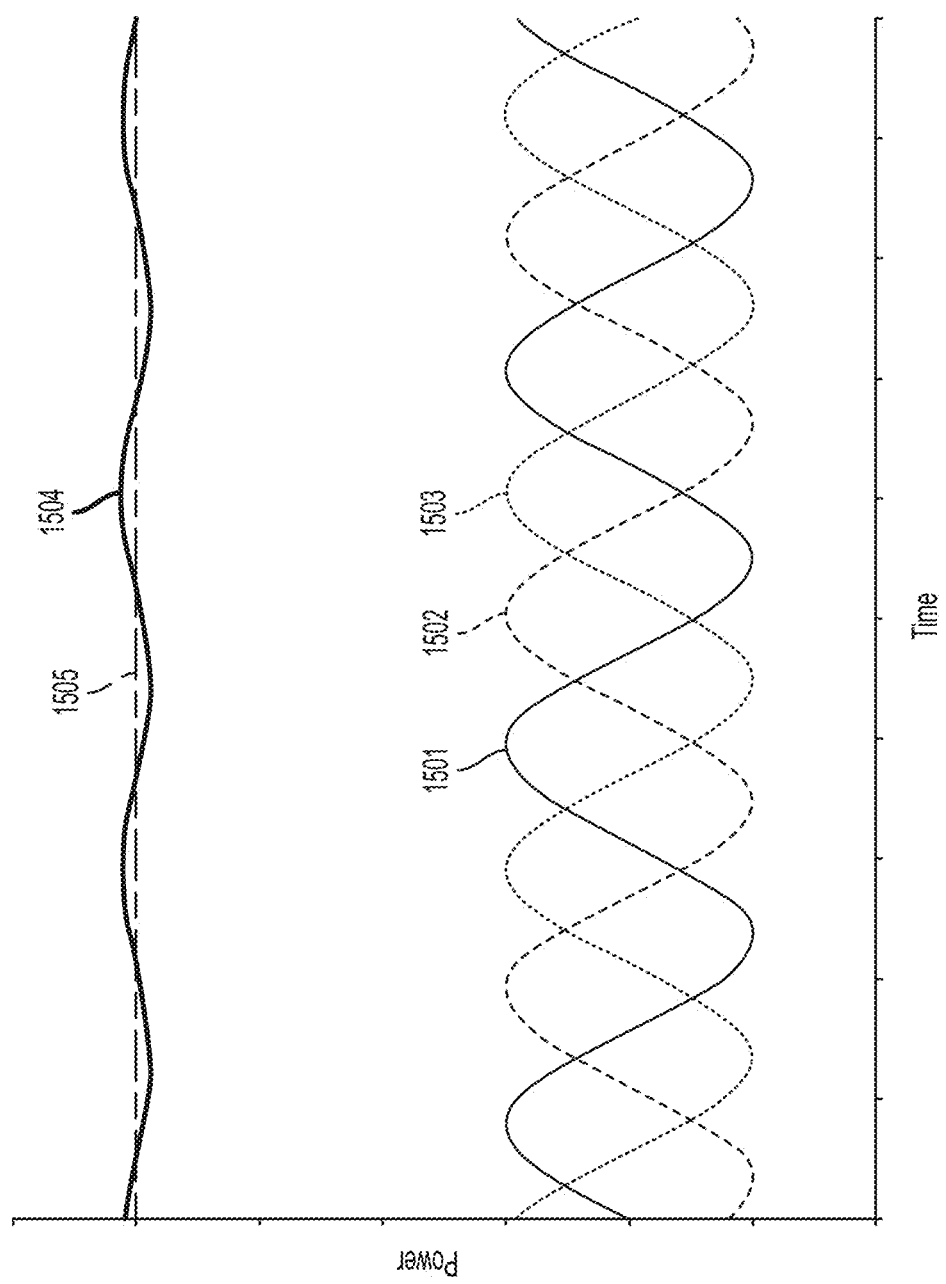
FIG. 15 example load profile at a multi-well pad with base load and fluctuating load, as a result of staggering the pumps

For purposes of explaining the concept, we may take an example where all three pumps have a sinusoidal load profile that varies between 5 kW and 15 kW. FIG. 15 shows the power draws (1501, 1502, 1503) for the three pumps. They are staggered over time. The total power draw (1504), obtained by adding the three individual power draws (1501, 1502, 1503), is also a sinusoid. The average total power draw (1505) is 30 kW, and the oscillation amplitude is about 1 kW. In this case, it may be cost efficient to install a modular power plant containing one 30 kW engine-generator set, one 5 kW engine-generator set, and three 15 kW motor drives. The control system may control the 30 kW engine-generator set to have a slow response time, and the control system may control the 5 kW engine-generator set to have a faster response time. This technique allows the 5 kW engine-generator set to respond to the load fluctuations while the 30 kW engine-generator set provides a base load.

What is claimed is:

1. A power generating unit, comprising:
   an engine-generator set, comprising:
      an engine that produces mechanical power; and
      a generator coupled to the engine, wherein the generator receives the mechanical power from the engine and converts the mechanical power to a first form of electrical power;
   a first power converter that receives the first form of electrical power from the generator and converts the first form of electrical power to a second form of electrical power;
   a DC link that receives the second form of electrical power from the first power converter;

an energy storage unit that receives the second form of electrical power from the DC link; and at least one controller configured to control fuel flow to the engine based on a voltage of the DC link, wherein the at least one controller is further configured to, while the engine is running:
- command a fuel system of the engine to have a first fuel flow setpoint;
- receive a signal representing the voltage of the DC link; and
- command the fuel system to have a second fuel flow setpoint different from the first fuel flow setpoint, the second fuel flow setpoint being based on the signal representing the voltage of the DC link.

2. The power generating unit of claim 1, further comprising a power delivery unit that receives the second form of electrical power from the DC link, and converts the second form of electrical power to a third form of electrical power, and provides the third form of electrical power as the output of the power generating unit.

3. The power generating unit of claim 1, wherein the engine that produces mechanical power is a gas turbine engine.

4. The power generating unit of claim 3, wherein the gas turbine engine is a two-shaft gas turbine engine comprising:
- a compressor;
- a first turbine that is mechanically coupled to the compressor; and
- a second turbine that is not mechanically coupled to the compressor or first turbine,
- wherein gas from the first turbine flows through the second turbine and rotates the second turbine to produce the mechanical power.

5. The power generating unit of claim 1, wherein the engine that produces mechanical power is a reciprocating engine.

6. The power generating unit of claim 1, wherein the generator mechanically coupled to the engine produces AC electrical power and the first power converter converts the AC electrical power to DC electrical power that is provided to the DC link.

7. The power generating unit of claim 1, wherein the first power converter is an AC-DC converter.

8. The power generating unit of claim 1, further comprising a power delivery unit that converts DC electrical power from the DC link to supply one or more loads.

9. The power generating unit of claim 8, wherein the power delivery unit is a DC-AC converter.

10. The power generating unit of claim 1, wherein the power generating unit is configured to operate in an off-grid application.

11. A control unit for a power generating unit comprising an engine-generator set including an engine that produces mechanical power and a generator mechanically coupled to the engine, wherein the generator converts the mechanical power to electrical power provided to a DC link, the control unit comprising:
- at least one controller configured to vary fuel flow to the engine based on a voltage of the DC link, and maintain fuel flow at a level that keeps the engine running as the fuel flow is varied based on the voltage of the DC link.

12. The control unit of claim 11, wherein the at least one controller controls fuel flow to the engine by commanding a set point to a fuel control valve.

13. The control unit of claim 11, wherein the at least one controller is at least a portion of a control loop, wherein:
- the control loop obtains a signal representing a voltage of the DC link;
- the control loop commands a set point to a fuel system of the engine based on the signal representing the voltage of the DC link; and
- the control loop maintains the voltage of the DC link within a specified range of values while keeping the engine running.

14. The control unit of claim 11, wherein the at least one controller comprises at least a portion of a plurality of control loops, wherein:
- a first control loop obtains a signal representing a voltage of the DC link, the first control loop commands an engine speed setpoint, and the first control loop maintains the voltage of the DC link within a specified range of values; and
- a second control loop obtains the engine speed setpoint, the second control loop commands a set point to a fuel system of the engine, and the second control loop maintains the engine speed at the set point commanded by the first control loop.

15. The control unit of claim 11, wherein the at least one controller is configured to:
- control power output from the generator to the DC link to regulate a speed of the generator; and
- control power output from a power delivery unit to a load to regulate a voltage of the power delivered to the load.

16. A modular power generating system, comprising:
- two or more engine-generator sets each producing a first form of electrical power;
- first power converters comprising a first power converter for each engine-generator set, each configured to receive a first form of electrical power from its corresponding engine-generator set, and convert the first form of electrical power to a second form of electrical power;
- a DC link that receives the second form of electrical power from the first power converters;
- an energy storage unit that receives the second form of electrical power from the DC link; and
- at least one controller configured to control fuel flow to each engine-generator set based on the voltage of the DC link.

17. The modular power generating system of 16, further comprising one or more power delivery units, each configured to receive the second form of electrical power from the DC link, convert the second form of electrical power to a third form of electrical power, and provide the third form of electrical power as the one or more outputs of the modular power generating system.

18. The modular power generating system of claim 16, wherein at least one of the engine-generator sets comprises a gas turbine engine.

19. The modular power generating system of claim 18, wherein at least one of the engine-generator sets comprises a two-shaft gas turbine engine comprising:
- a compressor;
- a first turbine that is mechanically coupled to the compressor; and
- a second turbine that is not mechanically coupled to the compressor or first turbine,
- wherein gas from the first turbine flows through the second turbine and rotates the second turbine to produce mechanical power.

20. The modular power generating system of claim 16, wherein at least one of the engine-generator sets comprises a reciprocating engine.

21. The modular power generating system of claim 16, wherein at least one of the engine-generator sets produces AC electrical power and each first power converter converts the AC electrical power to DC electrical power that is provided to the DC link.

* * * * *